(12) United States Patent
Kawashima et al.

(10) Patent No.: US 11,628,729 B2
(45) Date of Patent: Apr. 18, 2023

(54) INVERTER CONTROLLER AND ON-VEHICLE FLUID MACHINE

(71) Applicant: KABUSHIKI KAISHA TOYOTA JIDOSHOKKI, Kariya (JP)

(72) Inventors: Takashi Kawashima, Kariya (JP); Kazuki Najima, Kariya (JP); Tomohiro Takami, Kariya (JP); Yoshiki Nagata, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 283 days.

(21) Appl. No.: 17/101,098

(22) Filed: Nov. 23, 2020

(65) Prior Publication Data

US 2021/0162871 A1 Jun. 3, 2021

(30) Foreign Application Priority Data

Nov. 29, 2019 (JP) ............................. JP2019-216744

(51) Int. Cl.
*B60L 15/20* (2006.01)
*B60L 53/20* (2019.01)
*H02P 23/20* (2016.01)
*B60L 1/00* (2006.01)

(52) U.S. Cl.
CPC ............. *B60L 15/20* (2013.01); *B60L 1/003* (2013.01); *B60L 53/20* (2019.02); *H02P 23/20* (2016.02); *B60L 2240/14* (2013.01); *B60L 2240/421* (2013.01)

(58) Field of Classification Search
CPC ...... B60L 15/20; B60L 53/20; B60L 2240/14; B60L 2240/421; B60L 2240/423; B60L 2270/145; B60L 1/003; G05B 19/042; H02P 6/06; H02P 23/14; H02P 27/06; Y02T 10/64; Y02T 10/70; Y02T 10/7072; Y02T 10/72; Y02T 90/14

See application file for complete search history.

(56) References Cited

U.S. PATENT DOCUMENTS

2017/0369061 A1 12/2017 Sumi et al.

FOREIGN PATENT DOCUMENTS

| EP | 0670626 B1 | * | 9/2001 |
| JP | 2016-52203 | * | 4/2016 |
| JP | 2016-144361 A | | 8/2016 |
| KR | 2001-0010250 A | | 2/2001 |

* cited by examiner

*Primary Examiner* — Michael J Zanelli
(74) *Attorney, Agent, or Firm* — Sughrue Mion, PLLC

(57) ABSTRACT

An inverter controller includes a processing circuitry. The processing circuitry is configured to obtain a command rotation speed transmitted repeatedly from outside of the inverter controller, count a command obtaining interval that is a period from a point in time where an old command rotation speed was obtained to a point in time where a new command rotation speed is obtained, set a target acceleration of the electric motor when the command rotation speed has been obtained, and control the inverter circuit such that the electric motor rotates at the set target acceleration. The processing circuitry is configured to calculate a command acceleration based on the counted command obtaining interval and the new command rotation speed, the command acceleration being set as the target acceleration.

17 Claims, 13 Drawing Sheets

INVERTER CONTROLLER AND ON-VEHICLE FLUID MACHINE

BACKGROUND

1. Field

The present disclosure relates to an inverter controller and an on-vehicle fluid machine.

2. Description of Related Art

Japanese Laid-Open Patent Publication 2016-144361 discloses an inverter controller used to control an inverter. The inverter drives an electric motor arranged in an on-vehicle fluid machine. The inverter controller obtains a command rotation speed, which is periodically transmitted from outside, and calculates an acceleration that indicates a change rate of the rotation speed based on the difference between an actual rotation speed of the electric motor and the command rotation speed and based on a predetermined constant updating interval.

In some vehicles equipped with the on-vehicle fluid machine, the command rotation speed is not periodically transmitted from outside. In this case, the command rotation speed is not obtained at the predetermined updating interval. Thus, as disclosed in the publication, when the acceleration is calculated based on the predetermined updating interval, a difference easily occurs between the actual rotation speed and the command rotation speed. This may lower the followability of the actual rotation speed for a change in the command rotation speed. As a result, noise and vibration (NV) characteristics of the on-vehicle fluid machine may decrease.

SUMMARY

It is an object of the present disclosure to provide an inverter controller and an on-vehicle fluid machine equipped with the inverter controller capable of improving noise and vibration (NV) characteristics by improving the followability of an actual rotation speed even if a command rotation speed is non-periodically transmitted from outside.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An inverter controller according to an aspect of the present disclosure is used to control an inverter circuit. The inverter circuit is configured to drive an electric motor arranged in an on-vehicle fluid machine. The inverter controller includes a processing circuitry configured to obtain a command rotation speed transmitted repeatedly from outside of the inverter controller, count a command obtaining interval that is a period from a point in time where an old command rotation speed was obtained to a point in time where a new command rotation speed is obtained, the old command rotation speed being the command rotation speed that was precedingly obtained, the new command rotation speed being the command rotation speed that is presently obtained, set a target acceleration of the electric motor when the command rotation speed has been obtained, and control the inverter circuit such that the electric motor rotates at the set target acceleration. The processing circuitry is configured to calculate a command acceleration based on the counted command obtaining interval and the new command rotation speed, the command acceleration being set as the target acceleration.

An inverter controller according to an aspect of the present disclosure is used to control an inverter circuit. The inverter circuit is configured to drive an electric motor arranged in an on-vehicle fluid machine. The inverter controller includes a processing circuitry configured to obtain a command rotation speed transmitted repeatedly from outside of the inverter controller, set a target acceleration of the electric motor when the obtained command rotation speed, and control the inverter circuit such that the electric motor rotates at the set target acceleration. The processing circuitry is configured to count a command changing interval that is a period from a point in time where the command rotation speed was precedingly changed to a point in time where the command rotation speed is presently changed and calculate a command acceleration based on the counted command changing interval and a new command rotation speed, the command acceleration being set as the target acceleration, the new command rotation speed being the command rotation speed that is presently changed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An inverter controller 14 and an on-vehicle fluid machine equipped with the inverter controller 14 according to a first embodiment will now be described. The on-vehicle fluid machine of the present embodiment is an on-vehicle motor-driven compressor 10, which is used in an on-vehicle air conditioner 101.

The outline of the on-vehicle air conditioner 101 and the on-vehicle motor-driven compressor 10 will now be described.

Figure 1:
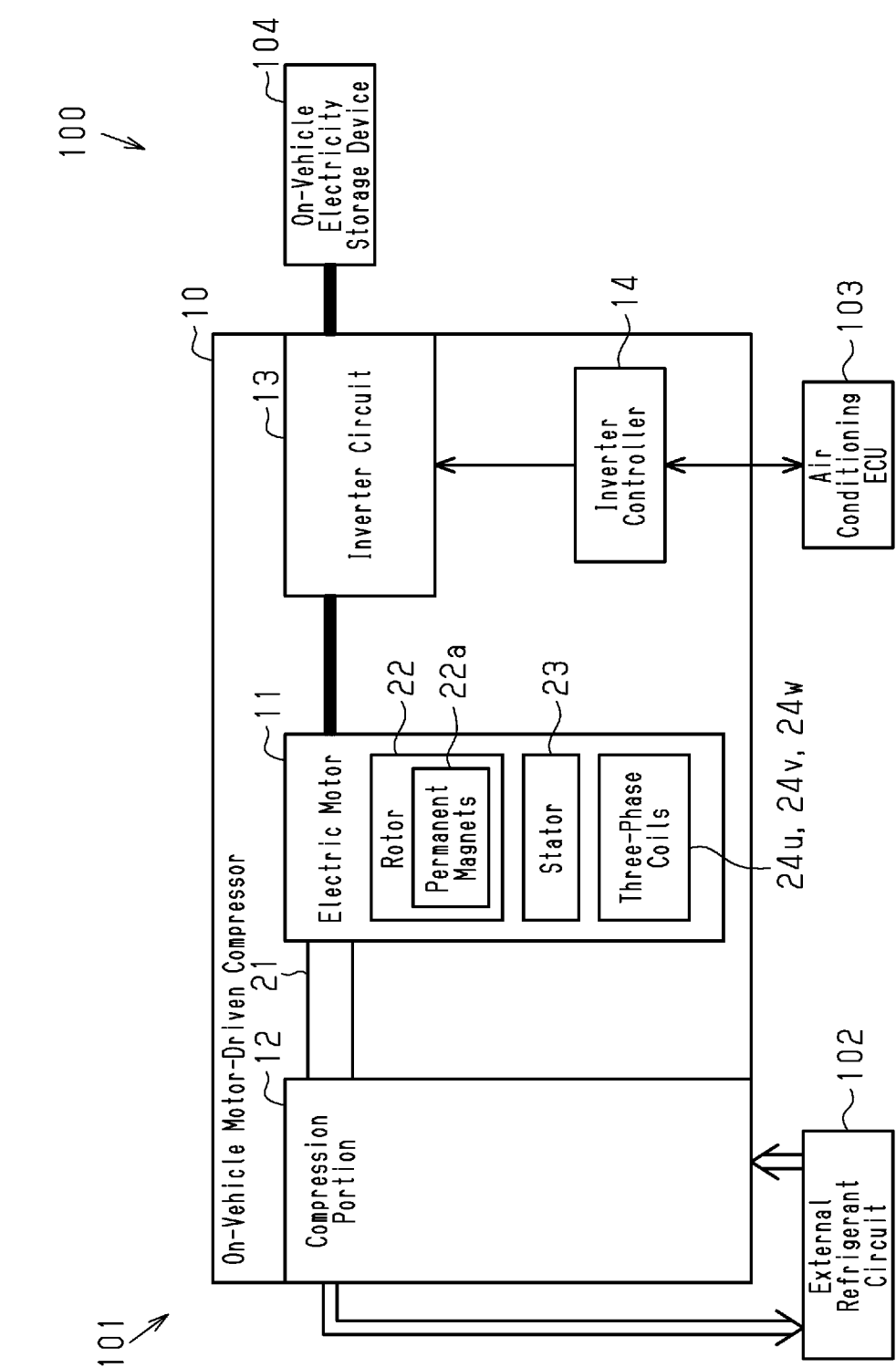
FIG. 1 is a block diagram schematically showing an on-vehicle motor-driven compressor according to a first embodiment.

As shown in FIG. 1, the on-vehicle air conditioner 101, which is installed in a vehicle 100, includes the on-vehicle motor-driven compressor 10 and an external refrigerant circuit 102. The external refrigerant circuit 102 supplies refrigerant to the on-vehicle motor-driven compressor 10. Refrigerant is, for example, a fluid.

The external refrigerant circuit 102 includes, for example, a heat exchanger and an expansion valve. The on-vehicle air conditioner 101 cools and warms the passenger compartment. More specifically, the on-vehicle motor-driven compressor 10 compresses refrigerant. In the external refrigerant circuit 102, heat exchange of refrigerant is performed and refrigerant is expanded.

The on-vehicle air conditioner 101 includes an air conditioning ECU 103, which controls the entire on-vehicle air conditioner 101. The air conditioning ECU 103 is capable of obtaining one or more parameters related to air conditioning, such as the temperature of the passenger compartment and a setting temperature for an automobile air conditioning system. Based on these parameters, the air conditioning ECU 103 outputs various commands, including a command rotation speed Nc, to the on-vehicle motor-driven compressor 10.

The vehicle 100 includes an on-vehicle electricity storage device 104. The on-vehicle electricity storage device 104 may include any configuration capable of charging and discharging DC power, such as a rechargeable battery or an electric double-layer capacitor. The on-vehicle electricity storage device 104 is used as the DC power source of the on-vehicle motor-driven compressor 10.

The on-vehicle motor-driven compressor 10 includes an electric motor 11, a compression portion 12, which is driven by the electric motor 11, an inverter circuit 13, which drives the electric motor 11, and the inverter controller 14, which is used to control the inverter circuit 13.

Figure 2:
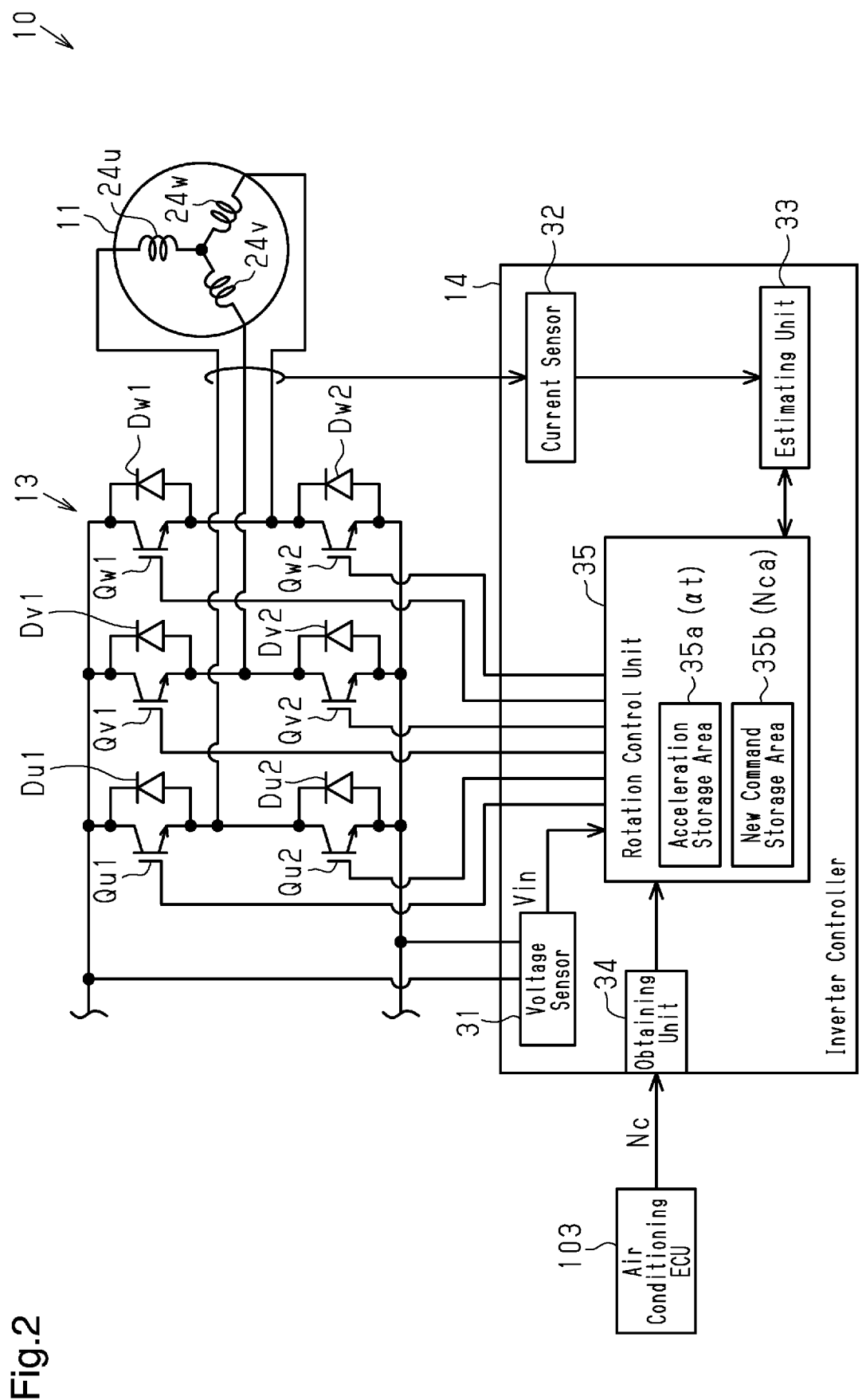
FIG. 2 is a block diagram showing the electrical configuration of the inverter circuit and the inverter controller that are incorporated in the motor-driven compressor of FIG. 1.

The electric motor 11 includes a rotary shaft 21, a rotor 22, which is fixed to the rotary shaft 21, a stator 23, which is arranged to be opposed to the rotor 22, and three-phase coils 24u, 24v, 24w, which are wound about the stator 23. The rotor 22 includes permanent magnets 22a. Specifically, the permanent magnets 22a are embedded in the rotor 22. As shown in FIG. 2, the three-phase coils 24u, 24v, 24w are connected to form, for example, a Y-connection. The rotor 22 and the rotary shaft 21 rotate when the three-phase coils 24u, 24v, 24w are energized in a predetermined pattern. That is, the electric motor 11 of the present embodiment is a three-phase motor.

The manner in which the three-phase coils 24u, 24v, 24w are connected together may be changed. For example, the three-phase coils 24u, 24v, 24w may form a delta connection. The rotation speed of the electric motor 11 means the rotation speed of the rotor 22. The acceleration of the electric motor 11 means the acceleration of the rotor 22.

When the electric motor 11 is driven, the compression portion 12 compresses a fluid (refrigerant in the present embodiment). Specifically, when the rotary shaft 21 is rotated, the compression portion 12 compresses the refrigerant supplied from the external refrigerant circuit 102 and discharges the compressed refrigerant. The compression portion 12 may have any specific configuration and may be of any type such as a scroll type, a piston type, or a vane type.

The inverter circuit 30 converts the DC power received from the on-vehicle electricity storage device 104 into AC power. The inverter circuit 13 includes u-phase switching elements Qu1, Qu2 corresponding to the u-phase coil 24u, v-phase switching elements Qv1, Qv2 corresponding to the v-phase coil 24v, and w-phase switching elements Qw1, Qw2 corresponding to the w-phase coil 24w.

Each of the switching elements Qu1, Qu2, Qv1, Qv2, Qw1, Qw2 (hereinafter referred to as the switching elements Qu1 to Qw2) is a power switching element, such as an insulated gate bipolar transistor (IGBT). The switching elements Qu1 to Qw2 are not limited to IGBTs and may have any configuration. The switching elements Qu1 to Qw2 include freewheeling diodes (body diodes) Du1 to Dw2, respectively.

The u-phase switching elements Qu1, Qu2 are connected to each other in series by a connection wire that is connected to the u-phase coil 24u. The collector of the u-phase switching element Qu1 is connected to the positive electrode terminal, which is the high-voltage side of the on-vehicle electricity storage device 104. The emitter of the u-phase switching element Qu2 is connected to the negative electrode terminal, which is the low-voltage side of the on-vehicle electricity storage device 104.

Except for the corresponding coils, the other switching elements Qv1, Qv2, Qw1, Qw2 have the same connection structure as the u-phase switching elements Qu1, Qu2.

The inverter controller 14 is a controller including electronic components such as a CPU and a memory. The inverter controller 14 controls the inverter circuit 13 (specifically, switching elements Qu1 to Qw2), thereby driving the electric motor 11.

The inverter controller 14 includes a voltage sensor 31, which detects an input voltage Vin of the inverter circuit 13, and a current sensor 32, which detects the motor current flowing through the electric motor 11. The input voltage Vin is the voltage at the on-vehicle electricity storage device 104 and is also the power supply voltage. The motor current is, for example, a three-phase current flowing through the three-phase coils 24u, 24v, 24w.

As shown in FIG. 2, the inverter controller 14 includes an estimating unit 33, which estimates the rotation position and rotation speed of the rotor 22. The estimating unit 33 uses the motor current and the command rotation speed Nc to estimate the rotation position of the rotor 22 and an actual rotation speed Nr of the rotor 22. The unit used for the command rotation speed Nc and the actual rotation speed Nr is, for example, rpm, but other units may be used.

The estimating unit 33 may have any specific configuration. The estimating unit 33 may include, for example, a converter that converts three-phase current into two-phase current and an induced voltage calculator. The induced voltage calculator calculates the induced voltage induced in the three-phase coils 24u, 24v, 24w based on the two-phase current that has been converted from the three-phase current by the converter and based on a motor constant. In this case, the estimating unit 33 estimates the rotation position and the actual rotation speed Nr of the rotor 22 based on, for example, the induced voltage and a d-axis current of the two-phase current.

The estimating unit 33 periodically obtains the detection result of the current sensor 32 and periodically estimates the rotation position and the actual rotation speed Nr of the rotor 22. This causes the estimating unit 33 to follow changes in the rotation position and the actual rotation speed Nr of the rotor 22.

The inverter controller 14 includes an obtaining unit 34 and a rotation control unit 35. The obtaining unit 34 obtains the command rotation speed Nc, which is repeatedly transmitted from outside, for example, from the air conditioning ECU 103. The rotation control unit 35 controls the rotation of the electric motor 11 based on the command rotation speed Nc that has been obtained by the obtaining unit 34.

The obtaining unit 34 is, for example, a connector that electrically connects the air conditioning ECU 103 and the inverter controller 14 to each other. When the air conditioning ECU 103 and the inverter controller 14 are electrically connected to each other by the obtaining unit 34, they can communicate information to and from each other. The obtaining unit 34 is also an input unit that receives various commands, including the command rotation speed Nc.

The air conditioning ECU 103 is configured to repeatedly transmit the command rotation speed Nc while the on-vehicle motor-driven compressor 10 is running. In the present embodiment, the air conditioning ECU 103 transmits the command rotation speed Nc periodically or non-periodically. That is, the air conditioning ECU 103 may transmit the command rotation speed Nc periodically or non-periodically in correspondence with the value of a parameter, such as the passenger compartment temperature and the setting temperature for the automobile air conditioning system. Thus, the obtaining unit 34 obtains the command rotation speed Nc periodically or non-periodically. That is, in the present embodiment, a command obtaining interval Tx, in which the command rotation speed Nc is obtained, is not fixed and may be varied.

The rotation control unit 35 is electrically connected to the obtaining unit 34. The rotation control unit 35 is electrically connected to the air conditioning ECU 103 via the obtaining unit 34. The command rotation speed Nc obtained by the obtaining unit 34 is input to the rotation control unit 35. That is, the rotation control unit 35 receives various commands from the air conditioning ECU 103 via the obtaining unit 34.

The rotation control unit 35 may include a communication anomaly function (in other words, a communication anomaly unit). The communication anomaly function determines that there is an anomaly in the communication with the air conditioning ECU 103 when no command is received (i.e., no command is obtained by the obtaining unit 34) over a predetermined anomaly determination period.

In such a configuration, the air conditioning ECU 103 may transmit the command rotation speed Nc even if the air conditioning ECU 103 does not change the command rotation speed Nc. For example, when a predetermined period (preferably, a period shorter than the determination period) has elapsed since the air conditioning ECU 103 precedingly transmitted the command rotation speed Nc, the air conditioning ECU 103 may transmit the command rotation speed Nc having the same value as the preceding command rotation speed Nc. This prevents the rotation control unit 35 from erroneously determining that there is a communication anomaly.

In the present embodiment, the air conditioning ECU 103 transmits a stop command to the inverter controller 14 when stopping the on-vehicle motor-driven compressor 10. In this case, the stop command is obtained by the obtaining unit 34 and transmitted toward the rotation control unit 35.

The rotation control unit 35 is electrically connected to the voltage sensor 31 and is capable of obtaining the input voltage Vin.

The rotation control unit 35 is also electrically connected to the estimating unit 33. This allows the rotation control unit 35 to obtain the rotation position and the actual rotation speed Nr of the rotor 22 that have been estimated by the estimating unit 33. The rotation control unit 35 is capable of transmitting, to the estimating unit 33, parameters necessary for estimation.

The rotation control unit 35 controls the inverter circuit 13, thereby controlling the electric motor 11. Specifically, the rotation control unit 35 executes pulse width modulation (PWM) control for the switching elements Qu1 to Qw2 of the inverter circuit 13, thereby controlling the motor current and rotating the electric motor 11 (specifically, the rotor 22).

The rotation control unit 35 may execute a rotation control process when a predetermined activation condition has been satisfied. The rotation control process includes a process that activates the electric motor 11, a process that sets a target acceleration $\alpha t$, and a process that controls the inverter circuit 13 such that acceleration and deceleration are executed with the set target acceleration $\alpha t$. The target acceleration $\alpha t$ is set based on, for example, the command rotation speed Nc obtained by the obtaining unit 34.

The activation condition causing the rotation control process to start simply needs to include, for example, a condition in which the electric motor 11 is not working and a condition in which the command rotation speed Nc has been obtained. For example, the activation condition may be that the command rotation speed Nc is obtained while the electric motor 11 is not working. Alternatively, in a configuration where the air conditioning ECU 103 transmits an activation command that includes information related to the command rotation speed Nc, the activation condition may be that the obtaining unit 34 obtains the activation command.

The control unit 35, which executes the rotation control process, may have any specific configuration. For example, the rotation control unit 35 may include a memory that stores the programs of the rotation control process or necessary information and include a CPU that executes the rotation control process based on the programs. In this case, the rotation control unit 35 may include, for example, a CPU that executes a process that sets the target acceleration at and a PWM-CPU that executes PWM control for the switching elements Qu1 to Qw2 based on the target acceleration $\alpha t$.

The rotation control unit 35 may include one or more hardware circuits that execute various processes related to the rotation control process or may include a combination of one or more hardware circuits and a CPU that executes software processing. In other words, the rotation control unit 35 only needs to be processing circuitry including, for example, at least one dedicated hardware circuit and at least one processor (control circuit) that operates in accordance with a computer program (software). In the same manner as the rotation control unit 35, the estimating unit 33 only needs to be processing circuitry including, for example, at least one dedicated hardware circuit and at least one processor (control circuit) that operates in accordance with a computer program (software).

The rotation control process will now be described with reference to FIG. 3.

Figure 3:
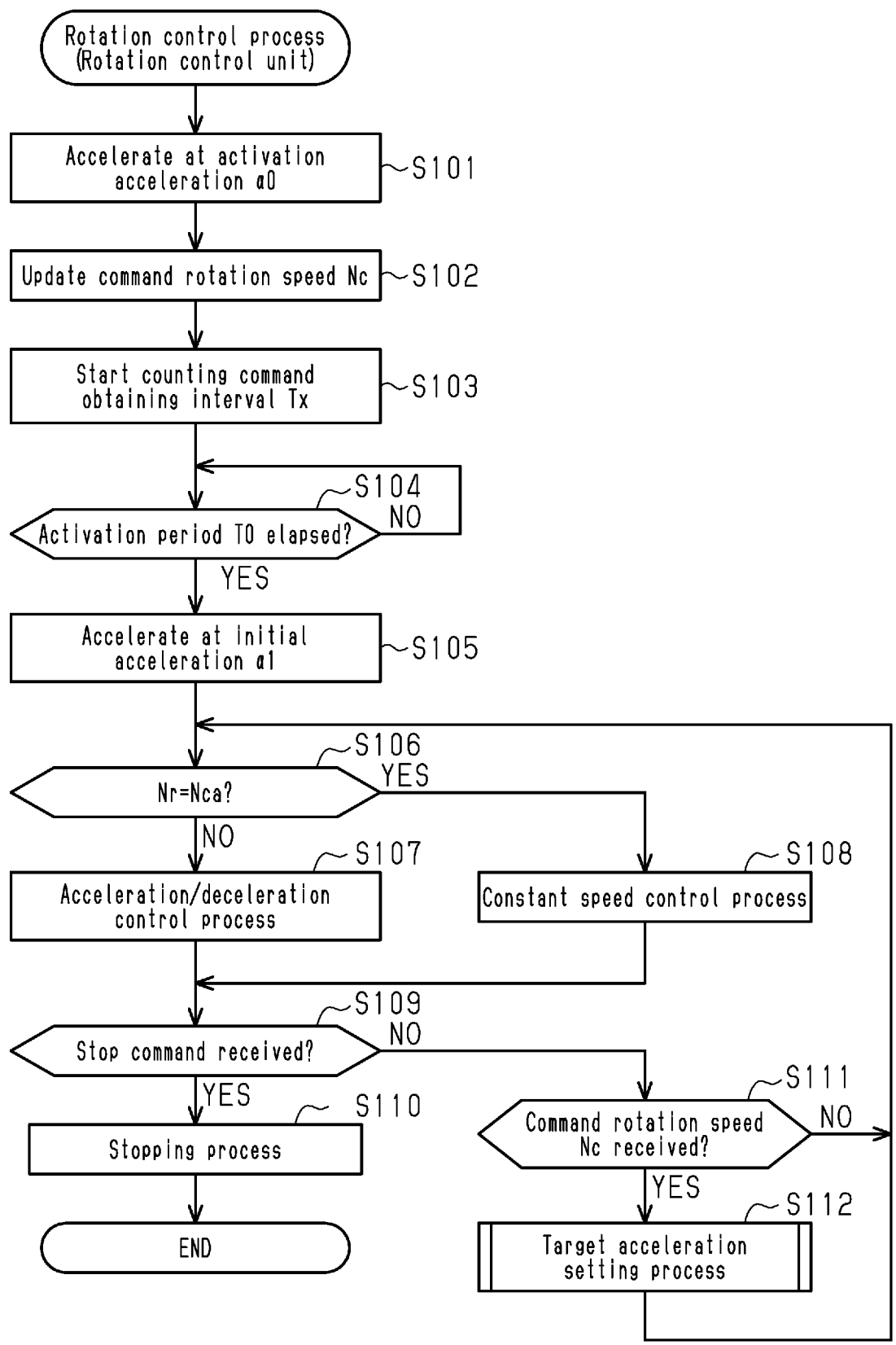
FIG. 3 is a flowchart illustrating a rotation control process of the first embodiment.

As shown in FIG. 3, in step S101, the rotation control unit 35 controls the inverter circuit 13 such that the electric motor 11 accelerates at an activation acceleration α0. The activation acceleration α0 is a fixed value that does not vary in correspondence with the value of the command rotation speed Nc that caused the rotation control process to start.

In an example of a specific configuration of executing the process of step S101, as shown in FIG. 2, the rotation control unit 35 may include an acceleration storage area 35a, which stores an acceleration. The rotation control unit 35 is configured to accelerate and decelerate the electric motor 11 at the acceleration stored in the acceleration storage area 35a. That is, the acceleration stored in the acceleration storage area 35a is the target acceleration at used when the inverter controller 14 accelerates and decelerates the electric motor 11, and the acceleration storage area 35a stores the target acceleration αt.

In such a configuration, in step S101, the rotation control unit 35 sets the activation acceleration α0 in the acceleration storage area 35a and controls the inverter circuit 13 such that the electric motor 11 accelerates at the activation acceleration α0.

As shown in FIG. 3, after executing step S101, the rotation control unit 35 executes an updating process of the command rotation speed Nc in step S102. Specifically, as shown in FIG. 2, the rotation control unit 35 includes a new command storage area 35b, which stores a new command rotation speed Nca (the presently-obtained command rotation speed Nc). The rotation control unit 35 causes the new command storage area 35b to store the command rotation speed Nc that caused the rotation control process to start.

As shown in FIG. 3, in the next step S103, the rotation control unit 35 starts counting the command obtaining interval Tx, in which the command rotation speed Nc is obtained.

As described above, the command rotation speed Nc may be obtained at non-periodic points in time. Thus, the rotation control unit 35 starts measuring the command obtaining interval Tx, which is from the point in time where the present command rotation speed Nc is obtained to the point in time where the next command rotation speed Nc will be obtained. The command obtaining interval Tx may be measured with any specific configuration. For example, the rotation control unit 35 may update a timer counter in a predetermined cycle.

Subsequently, in step S104, the rotation control unit 35 waits until a predetermined activation period T0 has elapsed since the acceleration at the activation acceleration α0 was started. The activation period T0 is a fixed value that does not vary in correspondence with the value of the command rotation speed Nc that caused the rotation control process to start.

Even if the command rotation speed Nc has been obtained during the elapse of the activation period T0, the rotation control unit 35 does not execute a process that deals with the command rotation speed Nc. That is, regardless of whether the obtaining unit 34 has obtained the command rotation speed Nc, the rotation control unit 35 maintains the acceleration at the activation acceleration α0 until the activation period T0 has elapsed since the electric motor 11 was activated.

A lower limit value of the command rotation speed Nc may be defined in advance. In this case, the activation acceleration α0 and the activation period T0 may be set such that the actual rotation speed Nr after the elapse of the activation period T0 is not greater than the lower limit value of the command rotation speed Nc.

After the acceleration at the activation acceleration α0 has been executed over the activation period T0, the rotation control unit 35 proceeds to step S105. In step S105, the rotation control unit 35 accelerates the electric motor 11 at a predetermined initial acceleration α1.

For example, the initial acceleration α1 is less than the activation acceleration α0. Thus, the NV characteristics during the acceleration at the initial acceleration α1 is better than the NV characteristics during the acceleration at the activation acceleration α0. The specific value of the initial acceleration α1 may be equal to the value of the activation acceleration α0 or may be greater than the value of the activation acceleration α0.

In other words, when activating the electric motor 11, the rotation control unit 35 activates the electric motor 11 at the predetermined activation acceleration α0 over the activation period T0 regardless of the command rotation speed Nc and then accelerates the electric motor 11 at the initial acceleration α1.

Subsequently, in steps S106 to S108, the rotation control unit 35 executes a process that causes the actual rotation speed Nr to become the currently-set new command rotation speed Nca. Specifically, in step S106, the rotation control unit 35 obtains the actual rotation speed Nr estimated by the estimating unit 33 and determines whether the actual rotation speed Nr is equal to the new command rotation speed Nca, which is a target value of the actual rotation speed Nr.

When the actual rotation speed Nr is not equal to the new command rotation speed Nca, the rotation control unit 35 executes an acceleration/deceleration control in step S107. The acceleration/deceleration control executes acceleration and deceleration at the target acceleration at such that the actual rotation speed Nr becomes close to the new command rotation speed Nca. The target acceleration at is stored in the acceleration storage area 35a. Also, the target acceleration αt is the currently-set acceleration.

The rotation control unit 35 accelerates the electric motor 11 when the target acceleration αt is positive and decelerates the electric motor 11 when the target acceleration αt is negative. That is, the target acceleration αt of the present embodiment is a parameter that may take a positive or negative value. After executing the process of step S107, the rotation control unit 35 proceeds to step S109.

When the actual rotation speed Nr is equal to the new command rotation speed Nca, the rotation control unit 35 executes an affirmative determination in step S106 and proceeds to step S108. In step S108, the rotation control unit 35 executes a constant speed control process, which controls the inverter circuit 13 such that the electric motor 11 maintains the current rotation speed (i.e., new command rotation speed Nca), and then proceeds to step S109. Specifically, the rotation control unit 35 sets the target acceleration αt to 0 in the acceleration storage area 35a and rotates the electric motor 11 at a constant speed when 0 is stored in the acceleration storage area 35a.

In step S109, the rotation control unit 35 determines whether the rotation control unit 35 has received a stop command. That is, the rotation control unit 35 determines whether the stop command has been obtained by the obtaining unit 34. When the rotation control unit 35 has received the stop command, the rotation control unit 35 proceeds to step S110. In step S110, the rotation control unit 35 executes a stopping process that stops the electric motor 11 and ends the present rotation control process. In an example of the stopping process, the rotation control unit 35 may control the inverter circuit 13 so as to stop the energization of the electric motor 11 (the coils 24u to 24w).

When the rotation control unit 35 has not received the stop command, that is, when the stop command has not been obtained by the obtaining unit 34, the rotation control unit 35 proceeds to step S111. In step S111, the rotation control unit 35 determines whether the rotation control unit 35 has received a new command rotation speed Nc, that is, determines whether the command rotation speed Nc has been obtained by the obtaining unit 34.

When the rotation control unit 35 has not received the new command rotation speed Nc, the rotation control unit 35 directly returns to step S106. When the rotation control unit 35 has received the new command rotation speed Nc, the rotation control unit 35 executes a target acceleration setting process in step S112.

The target acceleration setting process will now be described with reference to FIG. 4.

Figure 4:
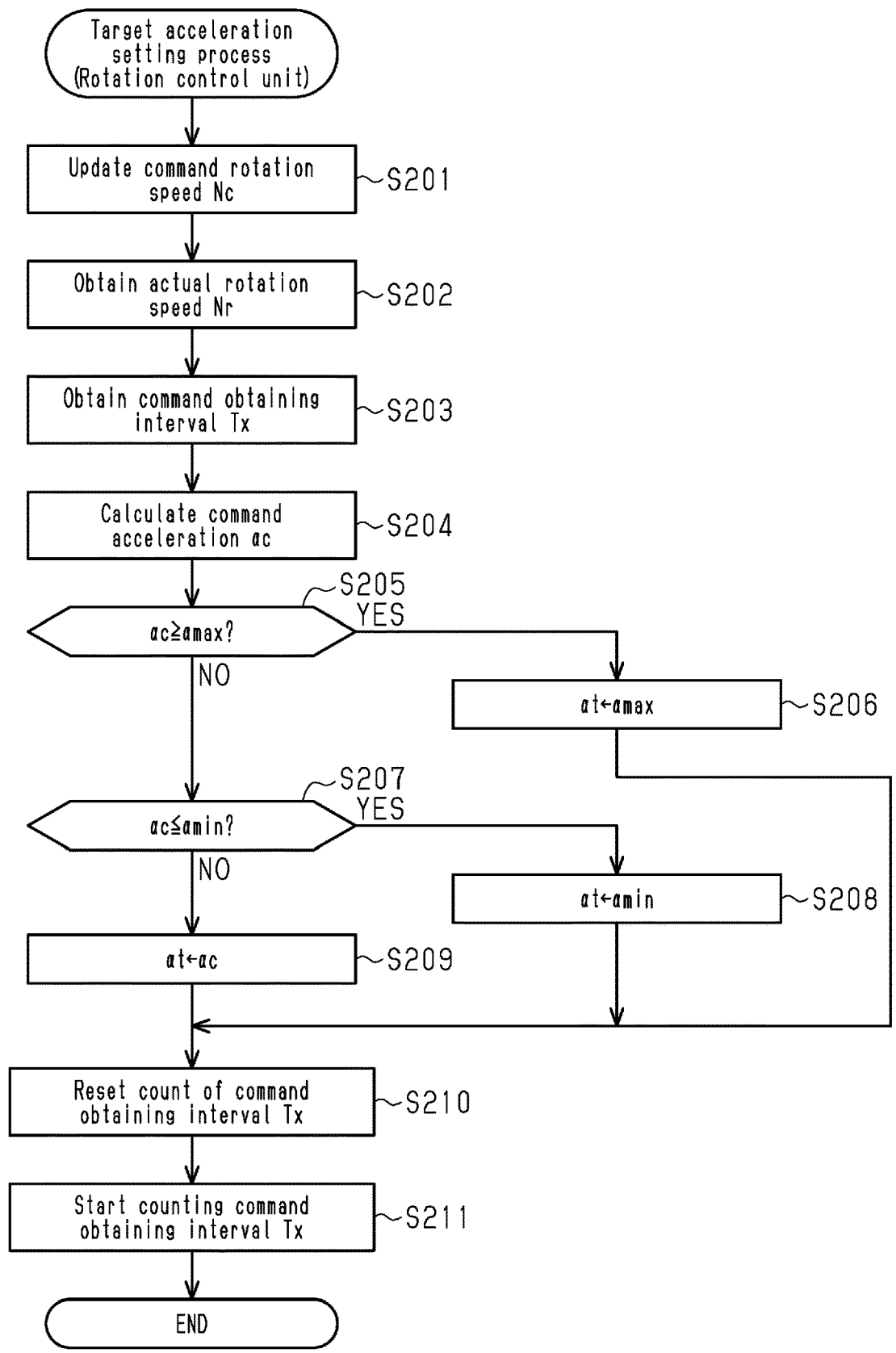
FIG. 4 is a flowchart illustrating a target acceleration setting process of the first embodiment.

As shown in FIG. 4, the rotation control unit 35 first executes an updating process of the command rotation speed Nc in step S201. Specifically, the rotation control unit 35 causes the new command storage area 35b to store the presently-obtained command rotation speed Nc as a new command rotation speed Nca. That is, the command rotation speed Nc that triggered the execution of the present target acceleration setting process is set as the new command rotation speed Nca.

Subsequently, in step S202, the rotation control unit 35 obtains the actual rotation speed Nr based on the estimation result of the estimating unit 33.

Then, in step S203, the rotation control unit 35 obtains the command obtaining interval Tx. Specifically, the rotation control unit 35 counts a period from when the step S103 or step S201 was executed to the current time based on a count value of the timer counter that has started counting upon the process of step S103 or step S211. That is, the command obtaining interval Tx also refers to a period from the point in time where the preceding command rotation speed Nc was obtained to the point in time where the present command rotation speed Nc is obtained.

For example, in a case where the command rotation speed Nc has initially been obtained since the rotation control process was started, that is, in a case where the target acceleration setting process has initially been executed, the command obtaining interval Tx is a period that has elapsed from the process of step S103.

In a case where the command rotation speed Nc has been obtained at or after the second time since the rotation control process was started, that is, in a case where the second or subsequent target acceleration setting process has been executed, the command obtaining interval Tx is a period from when the preceding target acceleration setting process (specifically, the process of step S211) was executed to when the present target acceleration setting process (specifically, the process of step S203) is executed.

In step S204, the rotation control unit 35 uses the obtaining results of step S202 and step S203 to execute a calculation process that calculates a command acceleration αc. The command acceleration αc may be set as the target acceleration αt and varies in correspondence with the presently-obtained command rotation speed Nc.

The command acceleration αc of the present embodiment is obtained by dividing, by the command obtaining interval Tx, the difference obtained by subtracting the actual rotation speed Nr from the new command rotation speed Nca; (αc=(Nca−Nr)/Tx).

As described above, the air conditioning ECU 103 may transmit a new command rotation speed Nc having the same value as the preceding command rotation speed Nc. Thus, the new command rotation speed Nca, which is the command rotation speed Nc that is presently obtained, may be equal to an old command rotation speed Ncb, which is the command rotation speed Nc that was precedingly obtained. Hypothetically, if the actual rotation speed Nr is equal to the old command rotation speed Ncb and the new command rotation speed Nca is equal to the old command rotation speed Ncb, the command acceleration αc is 0.

The command acceleration αc has a positive value when the actual rotation speed Nr is less than the new command rotation speed Nca and has a negative value when the actual rotation speed Nr is greater than the new command rotation speed Nca.

In terms of the relationship between the new command rotation speed Nca and the old command rotation speed Ncb, the command obtaining interval Tx refers to a period from the point in time where the old command rotation speed Ncb was obtained to the point in time where the new command rotation speed Nca is obtained.

Subsequently, in step S205, the rotation control unit 35 determines whether the command acceleration αc is greater than or equal to a predetermined upper limit acceleration αmax. The upper limit acceleration αmax is, for example, the upper limit value of the acceleration that allows the electric motor 11 to accelerate within a range in which no problems would occur. The upper limit acceleration αmax is defined in accordance with, for example, the standard of the electric motor 11 or the specification of the inverter circuit 13.

When the command acceleration αc is greater than or equal to the upper limit acceleration αmax, the rotation control unit 35 sets the upper limit acceleration αmax as the target acceleration αt in step S206. Specifically, the rotation control unit 35 sets the upper limit acceleration αmax in the acceleration storage area 35a and proceeds to step S210.

When the command acceleration αc is less than the upper limit acceleration αmax, the rotation control unit 35 proceeds to step S207 and determines whether the command acceleration αc is less than or equal to a predetermined lower limit acceleration αmin.

The lower limit acceleration αmin is, for example, the lower limit value of the acceleration that allows the electric motor 11 to decelerate within a range in which no problems would occur. The lower limit acceleration αmin is defined in accordance with, for example, the standard of the electric motor 11 or the specification of the inverter circuit 13. The lower limit acceleration αmin of the present embodiment is a negative value.

The command acceleration αc being less than or equal to the lower limit acceleration αmin means the command acceleration αc being a negative value and means the absolute value of the command acceleration αc being greater than the absolute value of the lower limit acceleration αmin.

When the command acceleration αc is less than or equal to the lower limit acceleration αmin, the rotation control unit 35 sets the lower limit acceleration αmin as the target acceleration αt in step S208. Specifically, the rotation control unit 35 sets the lower limit acceleration αmin in the acceleration storage area 35a and proceeds to step S210.

When the command acceleration αc is greater than the lower limit acceleration αmin, the rotation control unit 35 sets the command acceleration αc as the target acceleration αt in step S209. Specifically, the rotation control unit 35 sets the command acceleration αc in the acceleration storage area 35a and proceeds to step S210.

In step S210, the rotation control unit 35 resets the count of the command obtaining interval Tx. In step S211, the rotation control unit 35 starts counting the command obtaining interval Tx and ends the present target acceleration setting process. This counts the period from the point in time where the present command rotation speed Nc is obtained to the point in time where the next command rotation speed Nc will be obtained.

As shown in FIG. 3, after executing the target acceleration setting process in step S112, the rotation control unit 35 returns to step S106. Thus, when the actual rotation speed Nr is different from the new command rotation speed Nca, the rotation control unit 35 accelerates and decelerates the electric motor 11 at the target acceleration αt stored in the acceleration storage area 35a such that the actual rotation speed Nr becomes the new command rotation speed Nca.

In such a configuration, the rotation control unit 35 accelerates the electric motor 11 at the upper limit acceleration αmax when the command acceleration αc is greater than or equal to the upper limit acceleration αmax and decelerates the electric motor 11 at the lower limit acceleration αmin when the command acceleration αc is less than or equal to the lower limit acceleration αmin. The rotation control unit 35 rotates the electric motor 11 at the command acceleration αc when the command acceleration αc is greater than the lower limit acceleration αmin and less than the upper limit acceleration αmax.

In the present embodiment, the rotation control unit 35 that executes the processes of steps S103, S203, S211 corresponds to a count unit, and the rotation control unit 35 that executes the processes from steps S106 to S108 corresponds to a drive control unit. The rotation control unit 35 that executes the target acceleration setting process corresponds to an acceleration setting unit, and the rotation control unit 35 that executes the process of step S204 corresponds to a calculation unit. The rotation control unit 35 that executes the processes of steps S101, S104 corresponds to an activation control unit.

Figure 5:
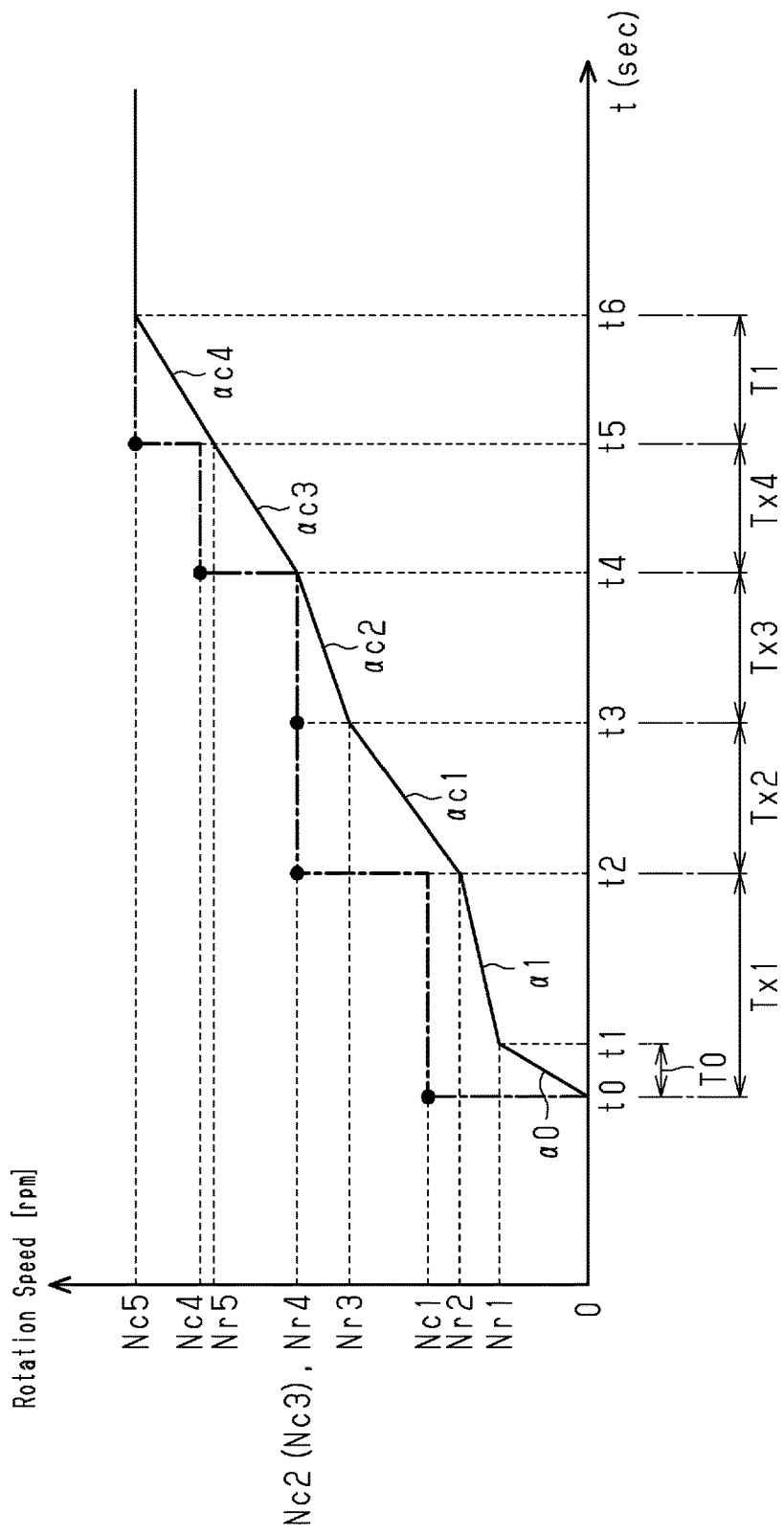
FIG. 5 is a graph illustrating temporal changes in the command rotation speed and temporal changes in the actual rotation speed in the first embodiment.
Figure 6:
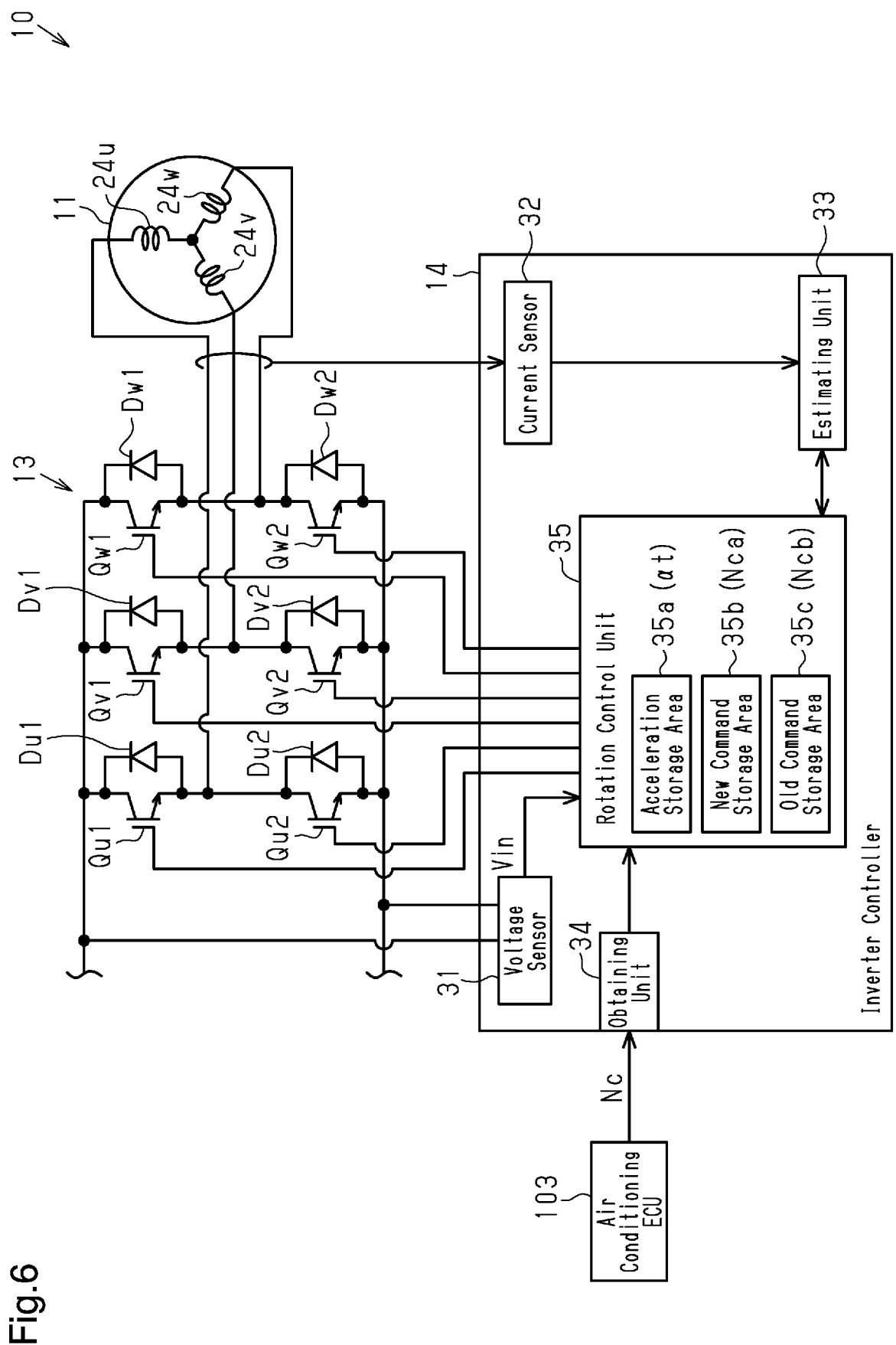
FIG. 6 is a block diagram showing the electrical configuration of the inverter controller according to a second embodiment.

The operation of the present embodiment will now be described with reference to FIG. 5. FIG. 5 is a graph illustrating temporal changes in the command rotation speed Nc that is to be obtained and temporal changes in the actual rotation speed Nr. In FIG. 5, the temporal changes in the command rotation speed Nc are shown by the broken line, and the temporal changes in the actual rotation speed Nr are shown by the solid line. While FIG. 5 illustrates the temporal changes that occur when the electric motor 11 is activated and accelerated, temporal changes occur in the same manner in the case of deceleration.

As shown in FIG. 5, it is assumed that the initial command rotation speed Nc is first obtained at the point in time t0. This starts the rotation control process and activates the on-vehicle motor-driven compressor 10. Specifically, the electric motor 11 first accelerates at the activation acceleration α0. The command rotation speed Nc obtained at the point in time t0 is referred to as a first command rotation speed Nc1.

At the point in time t1, when the activation period T0 has elapsed from the point in time t0, the acceleration is changed from the activation acceleration α0 to the initial acceleration α1. This accelerates the electric motor 11 at the initial acceleration α1. When the actual rotation speed Nr at the point in time t1 is a first actual rotation speed Nr1, the first actual rotation speed Nr1 is less than the first command rotation speed Nc1.

Subsequently, when a second command rotation speed Nc2 is obtained at the point in time t2, a first command acceleration αc1 is calculated and the electric motor 11 accelerates at the first command acceleration αc1. The period from the point in time t0 to the point in time t2 is a first command obtaining interval Tx1. The actual rotation speed Nr at the point in time t2 is a second actual rotation speed Nr2. In this case, the first command acceleration αc1 is obtained by dividing, by the first command obtaining interval Tx1, the difference obtained by subtracting the second actual rotation speed Nr2 from the second command rotation speed Nc2.

At the subsequent point in time t3, when a third command rotation speed Nc3, which is equal to the second command rotation speed Nc2, is obtained, a second command acceleration αc2 is calculated and the electric motor 11 accelerates at the second command acceleration αc2.

In this case, the period from the point in time t2 to the point in time t3 is a second command obtaining interval Tx2, and the actual rotation speed Nr at the point in time t3 is a third actual rotation speed Nr3. The second command acceleration αc2 is obtained by dividing, by the second command obtaining interval Tx2, the difference obtained by subtracting the third actual rotation speed Nr3 from the third command rotation speed Nc3.

In the present embodiment, when the command acceleration αc is calculated based on the command obtaining interval Tx and the actual rotation speed Nr at the point in time where the command rotation speed Nc is obtained, the first command acceleration αc1 and the second command acceleration αc2 may have different values even if the second command rotation speed Nc2 is equal to the third command rotation speed Nc3. More specifically, since the third actual rotation speed Nr3 is closer to the command rotation speed Nc than the second actual rotation speed Nr2, the second command acceleration αc2 is less than the first command acceleration αc1. This causes the actual rotation speed Nr to become close to the command rotation speed Nc in a gentle manner.

When a fourth command rotation speed Nc4, which is greater than the third command rotation speed Nc3, is obtained at the point in time t4, a third command acceleration αc3 is calculated and the electric motor 11 accelerates at the third command acceleration αc3.

In this case, the period from the point in time t3 to the point in time t4 is a third command obtaining interval Tx3, and the actual rotation speed Nr at the point in time t4 is a fourth actual rotation speed Nr4. The third command acceleration αc3 is obtained by dividing, by the third command obtaining interval Tx3, the difference obtained by subtracting the fourth actual rotation speed Nr4 from the fourth command rotation speed Nc4.

Subsequently, when a fifth command rotation speed Nc5, which is greater than the fourth command rotation speed Nc4, is obtained at the point in time t5, a fourth command acceleration αc4 is calculated and the electric motor 11 accelerates at the fourth command acceleration αc4.

In this case, the period from the point in time t4 to the point in time t5 is a fourth command obtaining interval Tx4, and the actual rotation speed Nr at the point in time t5 is a fifth actual rotation speed Nr5. The fourth command acceleration αc4 is obtained by dividing, by the fourth command obtaining interval Tx4, the difference obtained by subtracting the fifth actual rotation speed Nr5 from the fifth command rotation speed Nc5.

Subsequently, at the point in time t6, when the first acceleration period T1 has elapsed from the point in time t5, the actual rotation speed Nr is equal to the fifth command rotation speed Nc5 and then the constant-speed rotation is performed.

Accelerating the electric motor 11 at the command acceleration αc calculated based on the command obtaining interval Tx and the command rotation speed Nc as described above causes the change rate of the command rotation speed Nc and the change rate of the actual rotation speed Nr per unit of time to become close to each other in each command obtaining interval Tx.

The present embodiment, as described above in detail, has the following advantages.

(1-1) The inverter controller 14 is used to control the inverter circuit 13, which drives the electric motor 11 in the on-vehicle motor-driven compressor 10 (an example of the on-vehicle fluid machine). The inverter controller 14 includes the obtaining unit 34 and the rotation control unit 35. The obtaining unit 34 obtains the command rotation speed Nc, which is repeatedly transmitted from outside (for example, from the air conditioning ECU 103). The rotation control unit 35 controls the rotation of the electric motor 11. The rotation control unit 35 is configured to execute the process that counts the command obtaining interval Tx, the target acceleration setting process, which sets the target acceleration αt of the electric motor 11 when the command rotation speed Nc has been obtained by the obtaining unit 34, and the process that controls the inverter circuit 13 such that the electric motor 11 rotates at the target acceleration αt. In the target acceleration setting process, the rotation control unit 35 is configured to execute the calculation process that calculates the command acceleration αc based on the command obtaining interval Tx and the new command rotation speed Nca.

In such a configuration, counting the command obtaining interval Tx allows the command obtaining interval Tx to be obtained even if the command rotation speed Nc is non-periodically transmitted from outside. Calculating the command acceleration αc based on the counted command obtaining interval Tx and the new command rotation speed Nca causes the change rate of the actual rotation speed Nr to become close to the change rate of the command rotation speed Nc even if the command obtaining interval Tx varies. This improves the followability of a change in the actual rotation speed Nr of the electric motor 11 for a change in the command rotation speed Nc, thereby improving the NV characteristics.

(1-2) The inverter controller 14 includes the estimating unit 33, which obtains the actual rotation speed Nr of the electric motor 11. The rotation control unit 35 calculates, as the command acceleration αc, a value obtained by dividing the difference between the new command rotation speed Nca and the actual rotation speed Nr by the command obtaining interval Tx.

The difference between the actual rotation speed Nr and the new command rotation speed Nca is employed as a parameter used to calculate the command acceleration αc. This allows the actual rotation speed Nr to become close to the command rotation speed Nc relatively quickly while causing the change rate of the actual rotation speed Nr to become close to the change rate of the command rotation speed Nc.

More specifically, when, for example, the old command rotation speed Ncb is less than the actual rotation speed Nr and the new command rotation speed Nca that is greater than the old command rotation speed Ncb is obtained, the command acceleration αc is greater when the actual rotation speed Nr is calculated based on the difference between the actual rotation speed Nr and the new command rotation speed Nca than when the actual rotation speed Nr is calculated based on the difference between the old command rotation speed Ncb and the new command rotation speed Nca. This allows the actual rotation speed Nr to quickly become close to the new command rotation speed Nca.

(1-3) By employing the difference between the new command rotation speed Nca and the actual rotation speed Nr as a parameter used to calculate the command acceleration αc, it is possible to favorably deal with the case where the new command rotation speed Nca having the same value as the old command rotation speed Ncb is obtained.

Hypothetically, if the difference between the new command rotation speed Nca and the old command rotation speed Ncb is employed as a parameter used to calculate the command acceleration αc, the command acceleration αc is 0 when the new command rotation speed Nca is equal to the old command rotation speed Ncb. Thus, the electric motor 11 rotates at a constant speed. This may cause an inconvenience in which the actual rotation speed Nr does not become close to the new command rotation speed Nca if the new command rotation speed Nca is hypothetically different from the actual rotation speed Nr at the point in time where the new command rotation speed Nca is obtained.

In the present embodiment, the difference between the new command rotation speed Nca and the actual rotation speed Nr is employed as a parameter used to calculate the command acceleration ac. Accordingly, even if the new command rotation speed Nca is equal to the old command rotation speed Ncb, the inconvenience does not occur.

Rather, as shown in FIG. 5, the actual rotation speed Nr is closer to the command rotation speed Nc at the point in time t3 than at the point in time t2. Thus, the third command acceleration αc3 is less than the second command acceleration αc2 and the actual rotation speed Nr becomes close to the command rotation speed Nc in a gentle manner. This improves the NV characteristics.

(1-4) When the calculated command rotation speed Nc is greater than or equal to the predetermined upper limit acceleration αmax, the rotation control unit 35 sets the upper limit acceleration αmax as the target acceleration αt.

In such a configuration, when the command acceleration αc is excessively high due to a large difference between the actual rotation speed Nr and the new command rotation speed Nca or due to a short command obtaining interval Tx, the electric motor 11 accelerates at the upper limit acceleration αmax. This prevents an excessive load from being applied to the electric motor 11.

(1-5) When the calculated command rotation speed Nc is less than or equal to the predetermined lower limit acceleration αmin, the rotation control unit 35 sets the lower limit acceleration αmin as the target acceleration αt.

In such a configuration, when the command acceleration α is excessively low due to a large difference between the actual rotation speed Nr and the new command rotation speed Nca or due to a short command obtaining interval Tx, the electric motor 11 decelerates at the lower limit acceleration αmin. This prevents an excessive load from being applied to the electric motor 11.

The command acceleration αc may become excessively low when, for example, the command obtaining interval Tx is excessively short and the new command rotation speed Nca is excessively lower than the actual rotation speed Nr.

(1-6) Regardless of whether the obtaining unit 34 has obtained the command rotation speed Nc, the rotation control unit 35 accelerates the electric motor 11 at the predetermined activation acceleration α0 until the predetermined activation period T0 has elapsed since the electric motor 11 was activated.

During the activation, the electric motor 11 tends to operate unstably. Thus, accelerating the electric motor 11 at the command acceleration αc during the activation period T0 may result in an inconvenience in which the rising of the electric motor 11 is unstable and the electric motor 11 fails to be activated.

In the present embodiment, even if the command rotation speed Nc is obtained during the activation period T0, the electric motor 11 is accelerated at the activation acceleration α0 instead of the command acceleration αc. This prevents the rising from becoming unstable and allows the electric motor 11 to be stably activated.

Second Embodiment

The present embodiment has, for example, a method of calculating the command acceleration αc that differs from that of the first embodiment. The differences will now be described.

As shown in FIG. 2, the rotation control unit 35 of the present embodiment includes the new command storage area 35b and an old command rotation storage area 35c. The old command rotation storage area 35c stores the old command rotation speed Ncb, which is the command rotation speed Nc that was precedingly obtained. This allows the rotation control unit 35 to refer to both the old command rotation speed Ncb and the new command rotation speed Nca when calculating the command acceleration αc.

The target acceleration setting process of the present embodiment will now be described with reference to FIG. 7.

Figure 7:
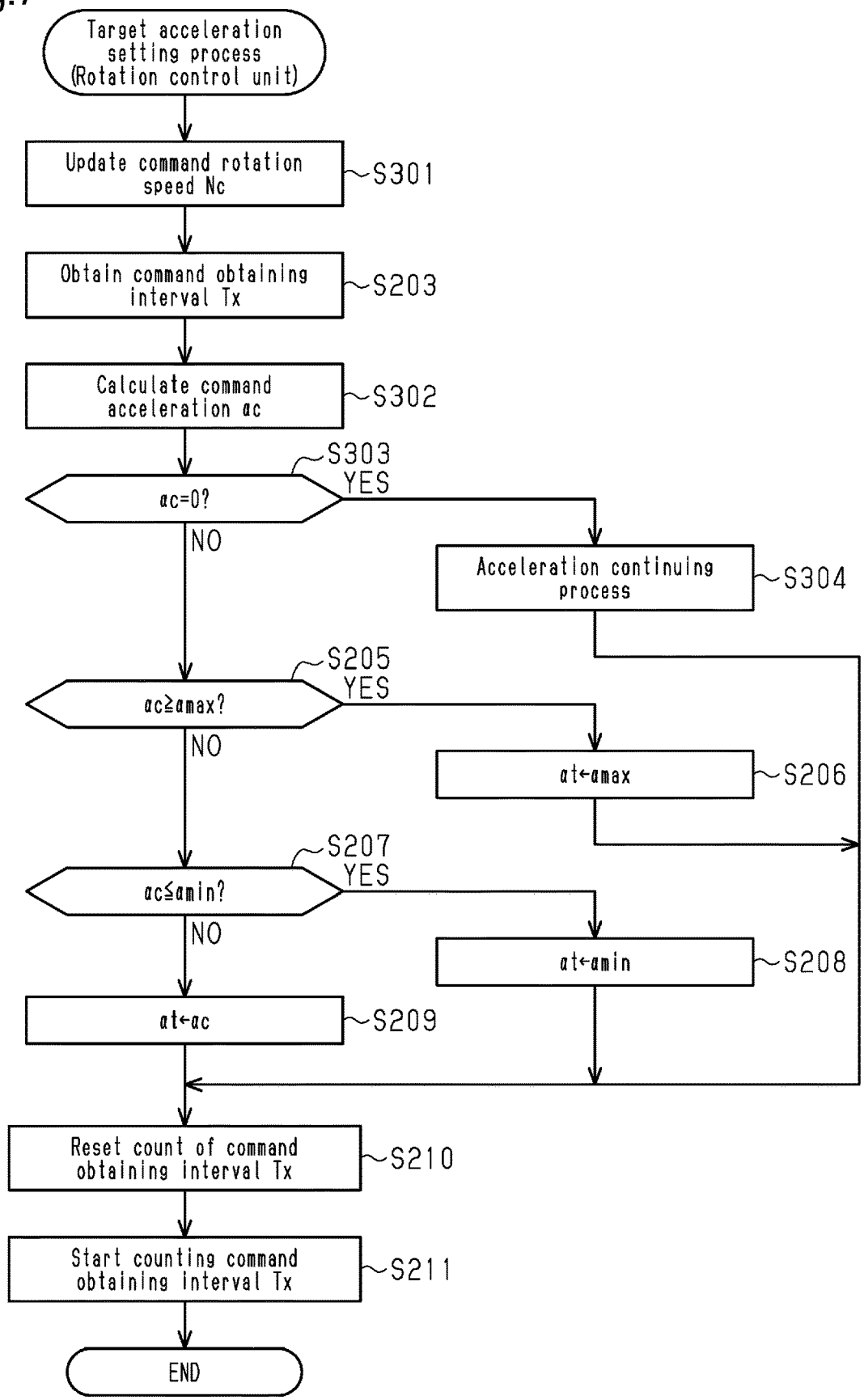
FIG. 7 is a flowchart illustrating the target acceleration setting process of the second embodiment.

As shown in FIG. 7, the rotation control unit 35 first executes an updating process of the command rotation speed Nc in step S301.

In the present embodiment, the rotation control unit 35 causes the old command rotation storage area 35c to store, as the old command rotation speed Ncb, the command rotation speed Nc that is currently stored in the new command storage area 35b. The rotation control unit 35 causes the new command storage area 35b to store the presently-obtained new command rotation speed Nc as the new command rotation speed Nca. That is, the command rotation speed Nc that triggered the execution of the present target acceleration setting process is set as the new command rotation speed Nca, and the command rotation speed Nc that has been set so far is set as the old command rotation speed Ncb.

After executing the process of step S203, the rotation control unit 35 uses the information stored in the command storage areas 35b, 35c and the obtaining result of the step S203 to calculate the command acceleration αc set as the target acceleration at in step S302. The command acceleration αc is obtained by dividing, by the command obtaining interval Tx, the difference obtained by subtracting the old command rotation speed Ncb from the new command rotation speed Nca; (αc=(Nca−Ncb)/Tx).

Then, in step S303, the rotation control unit 35 determines whether the command acceleration αc is 0. When the command acceleration αc is 0, the new command rotation speed Nca is equal to the command rotation speed Nc.

The rotation control unit 35 proceeds to step S205 when the command acceleration αc is not 0 and proceeds to step S304 when the command acceleration αc is 0. In step S304, the rotation control unit 35 executes an acceleration continuing process, which maintains the currently-set target acceleration at and proceeds to step S210.

That is, if 0 is hypothetically calculated as the command acceleration αc, the rotation control unit 35 maintains the currently-set value instead of setting 0 of the command acceleration αc.

The processes of steps S205 to S211 of the present embodiment are the same as those of the first embodiment and thus will not be described.

The operation of the present embodiment will now be described with reference to FIG. 8.

Figure 8:
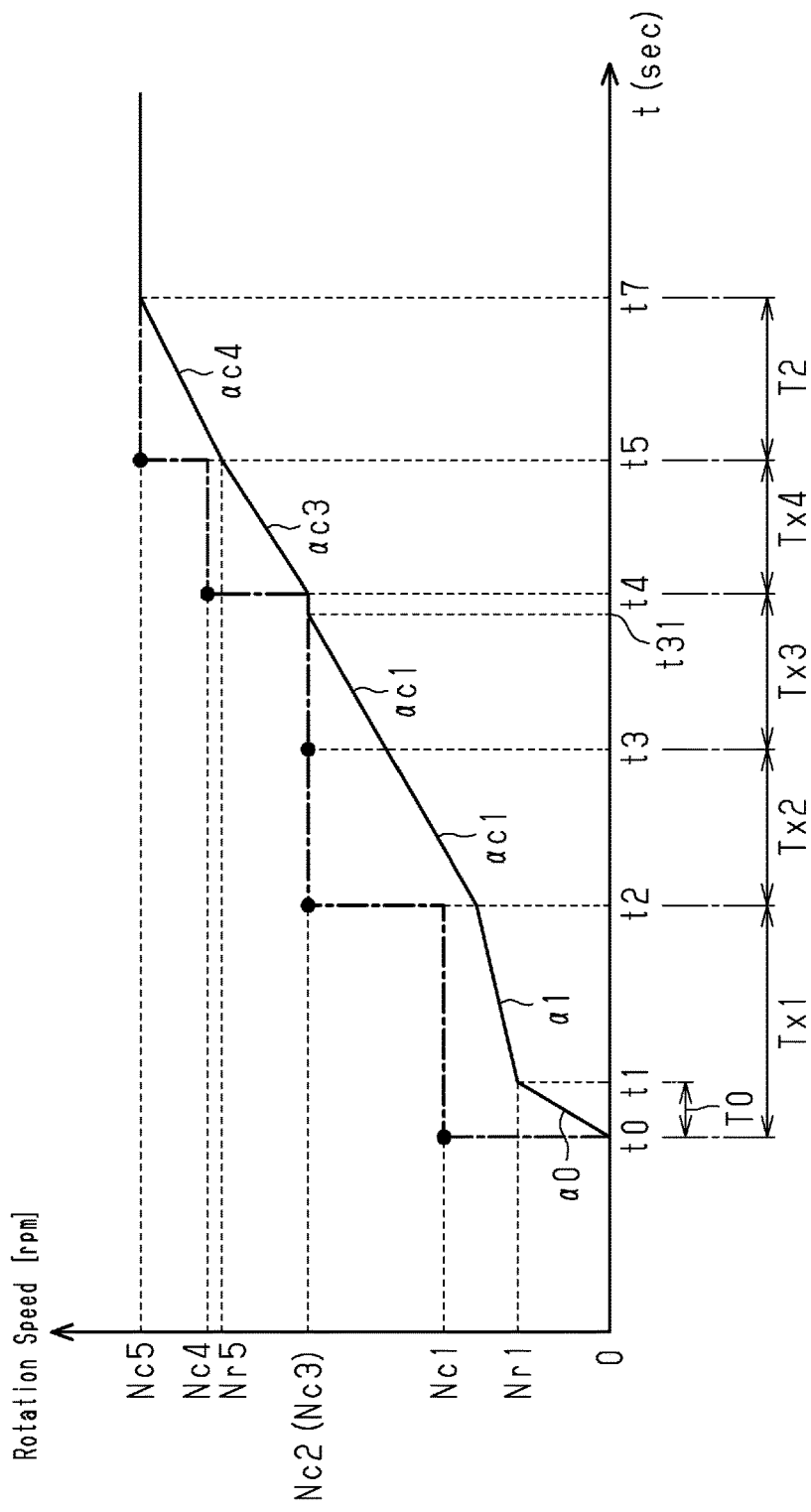
FIG. 8 is a graph illustrating temporal changes in the command rotation speed and temporal changes in the actual rotation speed in the second embodiment.

As shown in FIG. 8, the actual rotation speed Nr changes from the point in time t0 to the point in time t2 in the same manner as the first embodiment.

When the second command rotation speed Nc2 is obtained at the point in time t2, the first command acceleration αc1 is calculated and the electric motor 11 accelerates at the first command acceleration αc1. The first command acceleration αc1 is obtained by dividing, by the first command obtaining interval Tx1, the difference obtained by subtracting the first command rotation speed Nc1 from the second command rotation speed Nc2. Thus, the change rate of the actual rotation speed Nr is equal to the change rate of the command rotation speed Nc per unit of time in the first command obtaining interval Tx1.

Then, it is assumed that the third command rotation speed Nc3 that is equal to the second command rotation speed Nc2 is obtained at the point in time t3. In this case, the second command acceleration αc2 calculated based on the second command rotation speed Nc2 (old command rotation speed Ncb) and the third command rotation speed Nc3 (new command rotation speed Nca) is 0. Thus, the acceleration with the currently-set first command acceleration αc1 continues. This avoids situations in which the constant-speed rotation is performed despite the difference between the third actual rotation speed Nr3 and the third command rotation speed Nc3.

At the subsequent point in time t31, the actual rotation speed Nr reaches the third command rotation speed Nc3 so that the constant-speed rotation is performed.

Then, when the fourth command rotation speed Nc4 is obtained at the point in time t4, the third command acceleration αc3 is calculated and the electric motor 11 accelerates at the third command acceleration αc3. The third command acceleration αc3 is obtained by dividing, by the third command obtaining interval Tx3, the difference obtained by subtracting the third command rotation speed Nc3 from the fourth command rotation speed Nc4.

At the subsequent point in time t5, when the fifth command rotation speed Nc5 is obtained, the fourth command acceleration αc4 is calculated and the electric motor 11 accelerates at the fourth command acceleration αc4. The fourth command acceleration αc4 is obtained by dividing, by the fourth command obtaining interval Tx4, the difference obtained by subtracting the fourth command rotation speed Nc4 from the fifth command rotation speed Nc5.

At the point in time t7, when a second acceleration period T2 has elapsed from the point in time t5, the actual rotation speed Nr reaches the fifth command rotation speed Nc5 so that the electric motor 11 is rotated at a constant speed.

The difference between the fifth command rotation speed Nc5 and the fourth command rotation speed Nc4 is less than the difference between the fifth command rotation speed Nc5 and the fifth actual rotation speed Nr5. Thus, the fourth command acceleration αc4 of the second embodiment is less than the fourth command acceleration αc4 of the first embodiment. Also, the second acceleration period T2 tends to be longer than the first acceleration period T1. In other words, the actual rotation speed Nr reaches the fifth command rotation speed Nc5 more quickly in the second embodiment than in the first embodiment.

The present embodiment, as described above in detail, has the following advantages instead of advantages (1-2), (1-3).

(2-1) The rotation control unit 35 calculates, as the command acceleration αc, the value obtained by dividing the difference between the new command rotation speed Nca and the old command rotation speed Ncb by the command obtaining interval Tx.

Such a configuration allows the change rate of the actual rotation speed Nr to become almost equal to the change rate of the command rotation speed Nc per unit of time in each command obtaining interval Tx.

(2-2) In the comparative example, the difference between the new command rotation speed Nca and the actual rotation speed Nr is employed as a parameter used to calculate the command acceleration αc. In such a comparative example, when the actual rotation speed Nr differs from the old command rotation speed Ncb, sudden acceleration or deceleration that is not intended by the air conditioning ECU 103 is performed. This may worsen the NV characteristics.

In the present embodiment, the old command rotation speed Ncb is employed instead of the actual rotation speed Nr as a parameter used to calculate the command acceleration ac, thereby preventing the sudden acceleration or deceleration. This prevents the sudden acceleration or deceleration that occurs because the actual rotation speed Nr is not equal to the command rotation speed Nc.

(2-3) In the present embodiment, the command acceleration αc tends to be a lower value as compared with when the command acceleration αc is calculated using the actual rotation speed Nr. Thus, the period of acceleration/deceleration tends to be long. This limits situations in which the speed becomes the constant speed at a stage of acceleration or deceleration that sequentially changes the command rotation speed Nc.

Specifically, the sound of the electric motor 11 differs between a constant-speed state and an acceleration/deceleration state. Thus, when the constant-speed state and acceleration/deceleration state switch alternately, the sounds of the electric motor 11 switch alternately. As a result, the sounds tend to be recognized as noise.

In the present embodiment, a new command rotation speed Nc is easily obtained during acceleration or deceleration as compared with the first embodiment. Thus, alternate switching is prevented between the constant-speed state and the acceleration/deceleration state at the stage of acceleration or deceleration that sequentially changes the command rotation speed Nc. This prevents the worsening of the NV characteristics that results from alternate switching between the constant-speed state and the acceleration/deceleration state.

(2-4) The rotation control unit 35 maintains the currently-set value as the target acceleration at when the command acceleration αc is 0.

In such a configuration, when the presently-obtained new command rotation speed Nca is equal to the precedingly-obtained old command rotation speed Ncb, the currently-set target acceleration at is maintained. This prevents an inconvenience in which the obtaining of the new command rotation speed Nca that is equal to the old command rotation speed Ncb results in the execution of the constant-speed rotation although the actual rotation speed Nr has not reached the command rotation speed Nc.

The rotation control unit 35 is configured to set the target acceleration at to 0 in the acceleration storage area 35a and perform the constant-speed rotation when the actual rotation speed Nr is equal to the command rotation speed Nc. Thus, hypothetically, if the new command rotation speed Nca that is equal to the old command rotation speed Ncb is obtained during the constant-speed rotation, the constant-speed rotation is maintained.

Third Embodiment

The present embodiment has a method of calculating the command acceleration ac that differs from that of the first and second embodiments. The differences will now be described.

Figure 9:
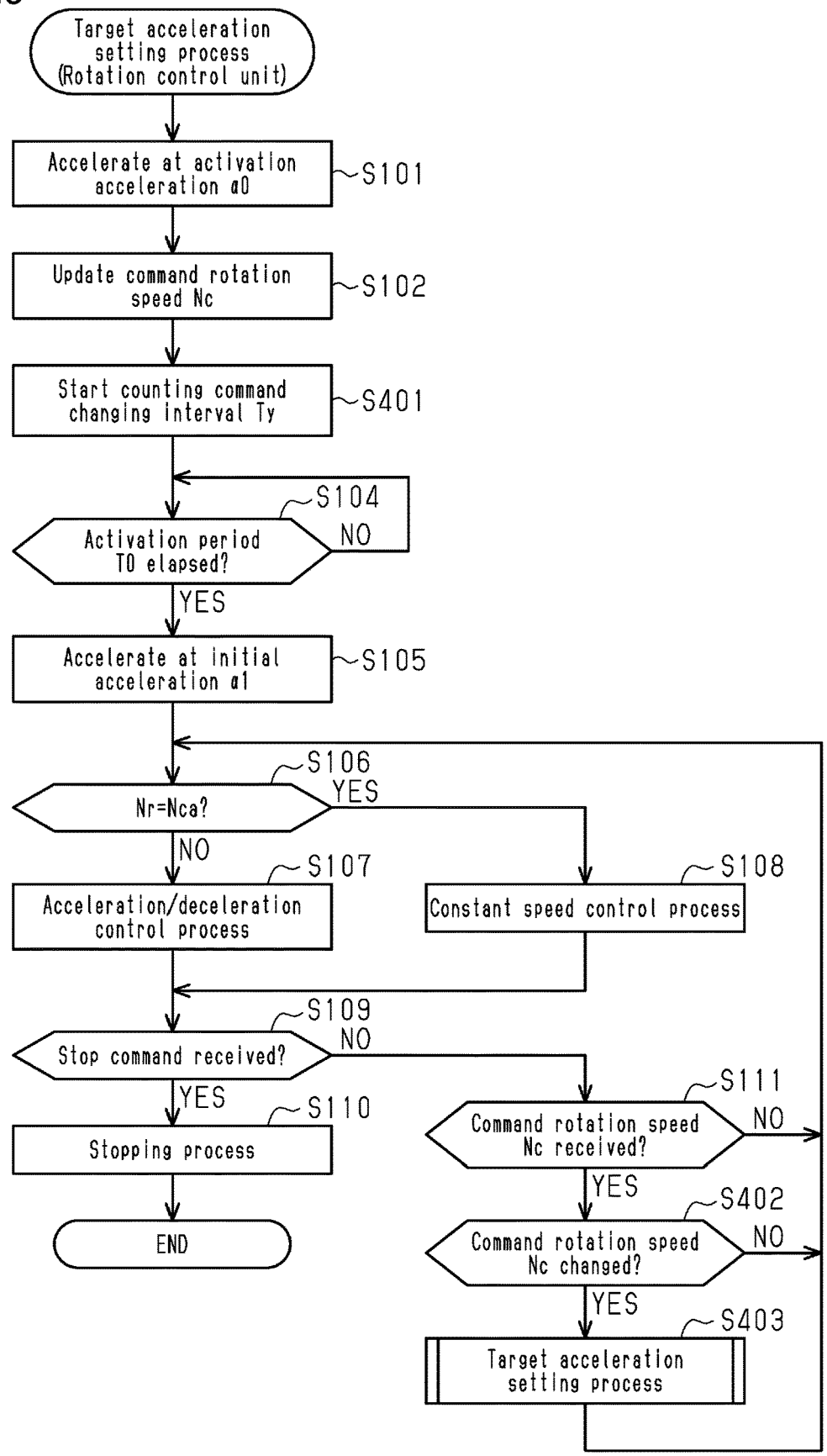
FIG. 9 is a flowchart illustrating the rotation control process according to a third embodiment.

As shown in FIG. 9, after executing step S102, the rotation control unit 35 of the present embodiment counts a command changing interval Ty in step S401 and proceeds to step S104.

The command changing interval Ty refers to a period from the point in time where the command rotation speed Nc was precedingly obtained to the point in time where the command rotation speed Nc is presently changed. In step S401, the rotation control unit 35 causes the timer counter counting the command changing interval Ty to start counting the command changing interval Ty and measures a period to when the command rotation speed Nc will be subsequently changed. The command changing interval Ty may be counted with any configuration.

As shown in FIG. 9, when determining an affirmative determination in step S111, the rotation control unit 35 proceeds to step S402 and determines whether the command rotation speed Nc has been changed. Specifically, the rotation control unit 35 determines whether the currently-set command rotation speed Nc is equal to the presently-obtained command rotation speed Nc.

When the command rotation speed Nc has not been changed, that is, when the currently-set command rotation speed Nc is equal to the presently-obtained command rotation speed Nc, the rotation control unit 35 returns to step S106 without executing the target acceleration setting process. Thus, the accelerated/decelerated rotation or constant-speed rotation continues at the currently-set target acceleration αt.

When the command rotation speed Nc has been changed, that is, when the currently-set command rotation speed Nc is different from the presently-obtained command rotation speed Nc, the rotation control unit 35 executes the target acceleration setting process in step S403 and returns to step S106.

In other words, the rotation control unit 35 of the present embodiment is configured to set the target acceleration at when the command rotation speed Nc has been changed instead of when the command rotation speed Nc has been obtained.

The target acceleration setting process of the present embodiment will now be described with reference to FIG. 10.

Figure 10:
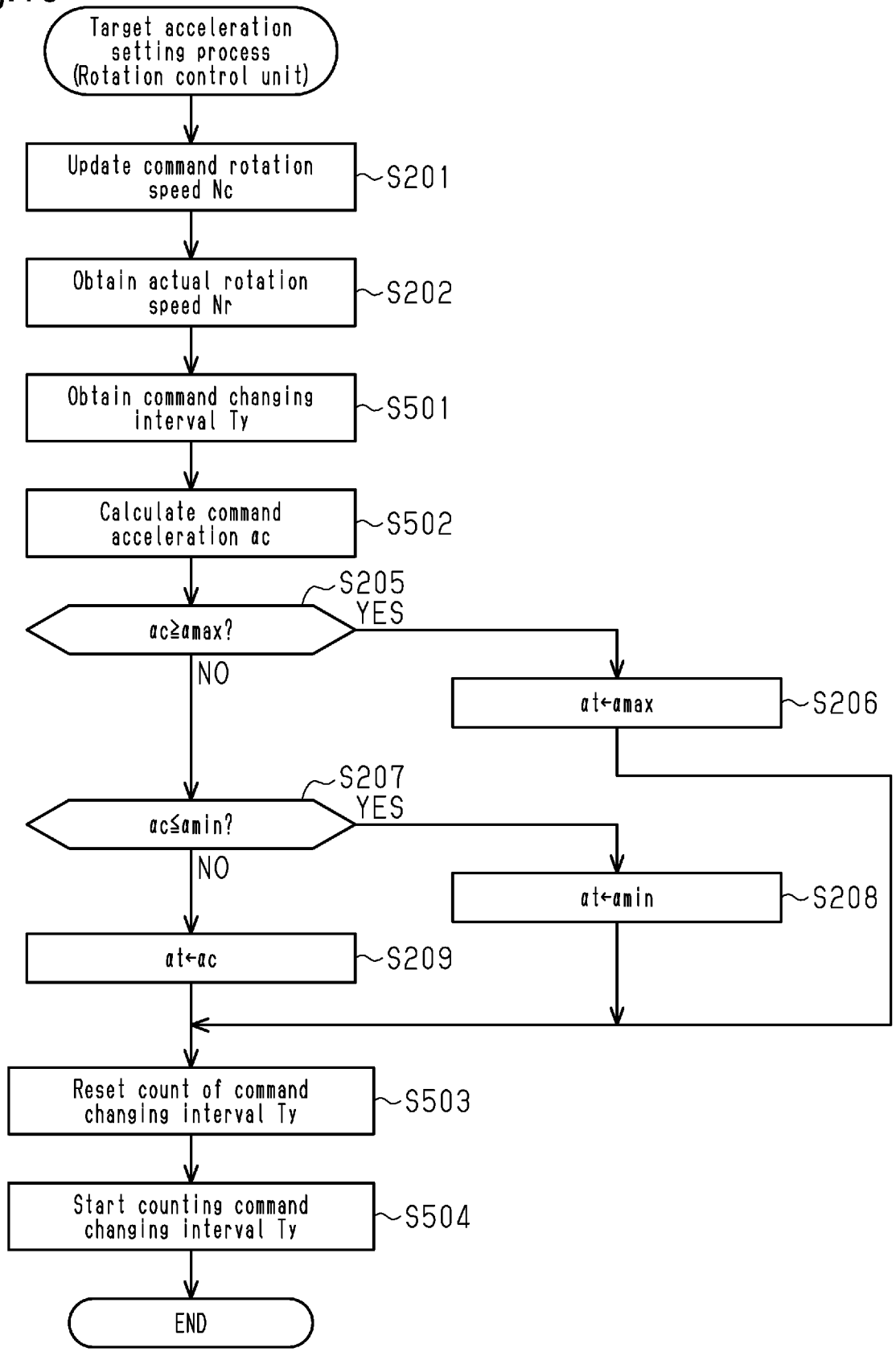
FIG. 10 is a flowchart illustrating the target acceleration setting process in the third embodiment.

As shown in FIG. 10, in the target acceleration setting process of the present embodiment, the rotation control unit 35 first updates the command rotation speed Nc in step S201. Specifically, the rotation control unit 35 causes the new command storage area 35b to store the presently-obtained command rotation speed Nc as the new command rotation speed Nca.

As described above, the target acceleration setting process of the present embodiment is executed when the command rotation speed Nc has been changed. Thus, the command rotation speed Nc is updated in a case where the command rotation speed Nc has been changed. Accordingly, in the present embodiment, the new command rotation speed Nca stored in the new command storage area 35b corresponds to the changed command rotation speed Nc. In other words, the new command storage area 35b of the present embodiment stores the changed command rotation speed Nc.

After executing step S202, the rotation control unit 35 obtains the command changing interval Ty in step S501. Specifically, the rotation control unit 35 counts a period from when the step S401 or step S504 was executed to the current time based on a count value of the timer counter that started counting upon the process of step S401 or step S504.

For example, in a case where the command rotation speed Nc that differs from the command rotation speed Nc that triggered the execution of the rotation control process has been obtained since the rotation control process was started (i.e., in a case where the target acceleration setting process has initially been executed), the command changing interval Ty refers to a period that has elapsed from the process of step S401.

In a case where the second and subsequent target acceleration setting processes have been executed since the rotation control process was started, the command changing interval Ty refers to a period from when the preceding target acceleration setting process (specifically, the process of step S504) was executed to when the present target acceleration setting process (specifically, the process of step S501) is executed.

Subsequently, the rotation control unit 35 calculates the command acceleration αc that is set as the target acceleration αt. The rotation control unit 35 of the present embodiment calculates the command acceleration αc based on the new command rotation speed Nca, which is the presently-changed rotation speed Nc. Specifically, the command acceleration αc is obtained by dividing, by the command changing interval Ty, the difference obtained by subtracting the actual rotation speed Nr from the new command rotation speed Nca; ($αc=(Nca-Nr)/Ty$).

After executing the process of step S206, S208, or S209, the rotation control unit 35 resets the count of the command changing interval Ty in step S503 and proceeds to step S504. In step S504, the rotation control unit 35 starts counting the command changing interval Ty. This counts a period from when the command rotation speed Nc is presently changed to when the command rotation speed Nc will be subsequently changed.

Figure 11:
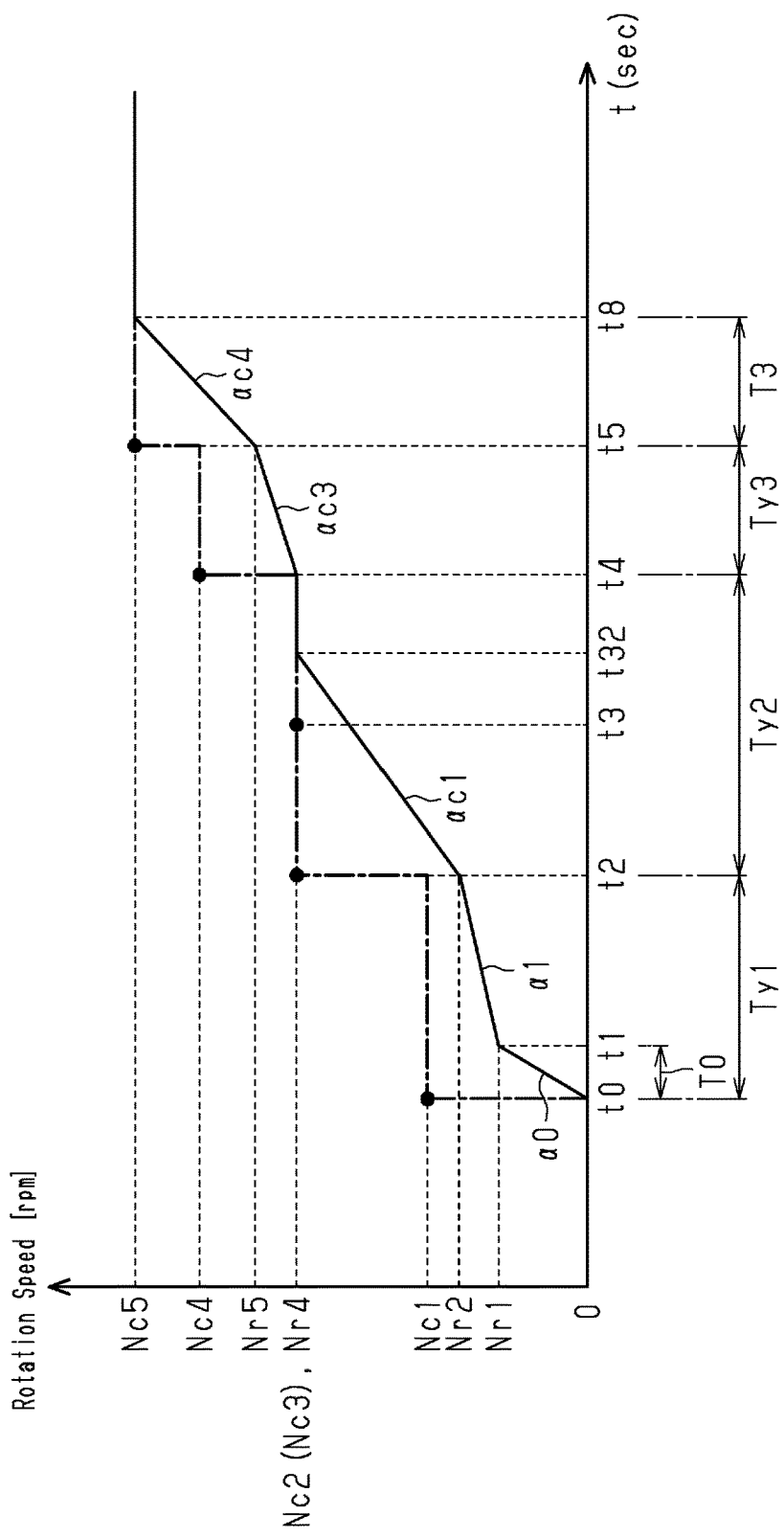
FIG. 11 is a graph illustrating temporal changes in the command rotation speed and temporal changes in the actual rotation speed in the third embodiment.

The operation of the present embodiment will now be described with reference to FIG. 11. FIG. 11 is a graph illustrating temporal changes in the command rotation speed Nc that is to be obtained and temporal changes in the actual rotation speed Nr. In FIG. 11, the temporal changes in the command rotation speed Nc are shown by the broken line, and the temporal changes in the actual rotation speed Nr are shown by the solid line. While FIG. 11 illustrates the temporal changes that occur when the electric motor 11 is activated and accelerated, temporal changes occur in the same manner in the case of deceleration.

As shown in FIG. 11, the actual rotation speed Nr changes from the point in time t0 to the point in time t2 in the same manner as the first embodiment.

When the second command rotation speed Nc2, which is different from the first command rotation speed Nc1, is obtained at the point in time t2, the first command acceleration αc1 is calculated and the electric motor 11 accelerates at the first command acceleration αc1. The first command acceleration αc1 is obtained by dividing, by a first command changing interval Ty1, the difference obtained by subtracting the first actual rotation speed Nr1 from the second command rotation speed Nc2. The first command changing interval Ty1 refers to a period from the point in time t0 to the point in time t2.

Then, it is assumed that the third command rotation speed Nc3 that is equal to the second command rotation speed Nc2 is obtained at the point in time t3. In this case, since the command rotation speed Nc has not been changed, a new target acceleration αt is not set. This causes the acceleration to continue at the first command acceleration αc1, which is the currently-set command acceleration αc.

At the subsequent point in time t32, the actual rotation speed Nr reaches the second command rotation speed Nc2 (third command rotation speed Nc3) so that the constant-speed rotation is performed.

Then, when the fourth command rotation speed Nc4, which is different from the second command rotation speed Nc2, is obtained at the point in time t4, the third command acceleration αc3 is calculated and the electric motor 11 accelerates at the third command acceleration αc3.

The period from the point in time t2 to the point in time t4 is referred to as a second command changing interval Ty2. The third command rotation speed Nc3 is a value obtained by dividing, by the second command changing interval Ty2, the difference obtained by subtracting the fourth actual rotation speed Nr4 from the fourth command rotation speed Nc4.

At the subsequent point in time t5, when the fifth command rotation speed Nc5, which is different from the fourth command rotation speed Nc4, is obtained, the fourth command acceleration αc4 is calculated and the electric motor 11 accelerates at the fourth command acceleration αc4.

The period from the point in time t4 to the point in time t5 is referred to as a third command changing interval Ty3. The fourth command acceleration αc4 is a value obtained by dividing, by the third command changing interval Ty3, the difference obtained by subtracting the fifth actual rotation speed Nr5 from the fifth command rotation speed Nc5.

Then, at the point in time t8, when a third acceleration period T3 has elapsed from the point in time t5, the actual rotation speed Nr reaches the fifth command rotation speed Nc5 so that the constant-speed rotation is performed.

The present embodiment, as described above in detail, has the following advantages.

(3-1) The inverter controller 14 is used to control the inverter circuit 13, which drives the electric motor 11 in the on-vehicle motor-driven compressor 10 (an example of the on-vehicle fluid machine). The inverter controller 14 includes the obtaining unit 34 and the rotation control unit 35. The obtaining unit 34 obtains the command rotation speed Nc, which is repeatedly transmitted from outside (in the present embodiment, from the air conditioning ECU 103). The rotation control unit 35 controls the rotation of the electric motor 11.

The rotation control unit 35 is configured to execute the process that counts the command changing interval Ty, which refers to the period from the point in time where the command rotation speed Nc was precedingly changed to the point in time where the command rotation speed Nc is presently changed. The rotation control unit 35 is configured to execute the target acceleration setting process, which sets the target acceleration αt of the electric motor 11 when the command rotation speed Nc has been changed by the obtaining unit 34, and the process that controls the inverter circuit 13 such that the electric motor 11 rotates at the target acceleration αt. In the target acceleration setting process, the rotation control unit 35 is configured to execute the calculation process that calculates the command acceleration αc (target acceleration αt) based on the command changing interval Ty and the presently-changed new command rotation speed Nca.

In such a configuration, even if the command rotation speed Nc is non-periodically transmitted from outside, the command changing interval Ty is obtained by counting the command changing interval Ty. Further, the command acceleration αc is calculated based on the counted command changing interval Ty and the new command rotation speed Nca. This allows the change rate of the actual rotation speed Nr to become close to the change rate of the command rotation speed Nc even if the command obtaining interval Tx varies. This improves the followability of a change in the actual rotation speed Nr of the electric motor 11 for a change in the command rotation speed Nc, thereby improving the NV characteristics.

(3-2) In particular, in the present embodiment, the target acceleration αt is set when the command rotation speed Nc has been changed instead of when the command rotation speed Nc is obtained. Thus, even if the same target acceleration αt is obtained, the target acceleration at remains unchanged. This prevents situations in which the acceleration of the electric motor 11 is changed despite no change in the command rotation speed Nc. Accordingly, the worsening of the NV characteristics due to a change in the acceleration is limited. Further, the command rotation speed Nc and the acceleration of the electric motor 11 are allowed to change in a more synchronized manner.

(3-3) The rotation control unit 35 calculates, as the command acceleration αc, a value obtained by dividing the difference between the new command rotation speed Nca and the actual rotation speed Nr by the command changing interval Ty.

In such a configuration, the difference between the new command rotation speed Nca and the actual rotation speed Nr is employed as a parameter used to calculate the command acceleration αc. This allows the actual rotation speed Nr to become close to the command rotation speed Nc relatively quickly while causing the change rate of the actual rotation speed Nr to become close to the change rate of the command rotation speed Nc in the same manner as advantage (1-2).

Fourth Embodiment

The present embodiment has, for example, a method of calculating the command acceleration αc that differs from that of the third embodiment. The differences will now be described.

Figure 12:
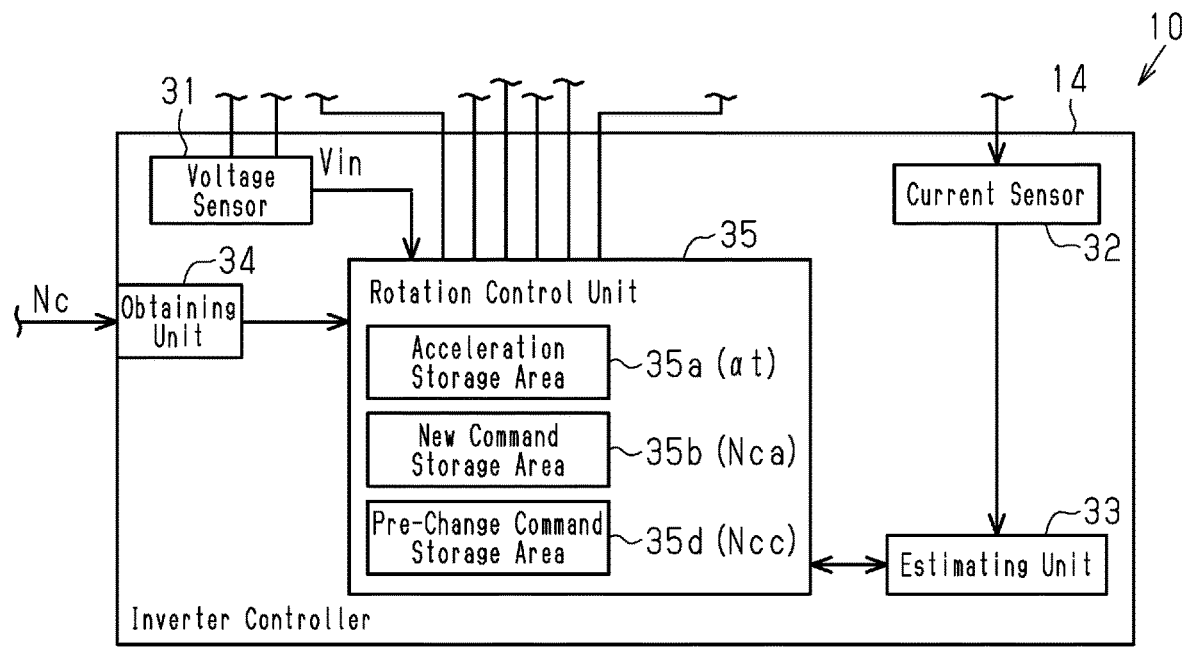
FIG. 12 is a block diagram showing the electrical configuration of the inverter controller according to a fourth embodiment.

As shown in FIG. 12, the rotation control unit 35 of the present embodiment includes the new command storage area 35b, which stores the presently-changed command rotation speed Nc, and a pre-change command storage area 35d, which stores a pre-change command rotation speed Ncc (the command rotation speed Nc prior to being changed). This allows the rotation control unit 35 to refer to both the pre-change command rotation speed Ncc and the new command rotation speed Nca when calculating the command acceleration αc.

The target acceleration setting process of the present embodiment will now be described with reference to FIG. 13.

Figure 13:
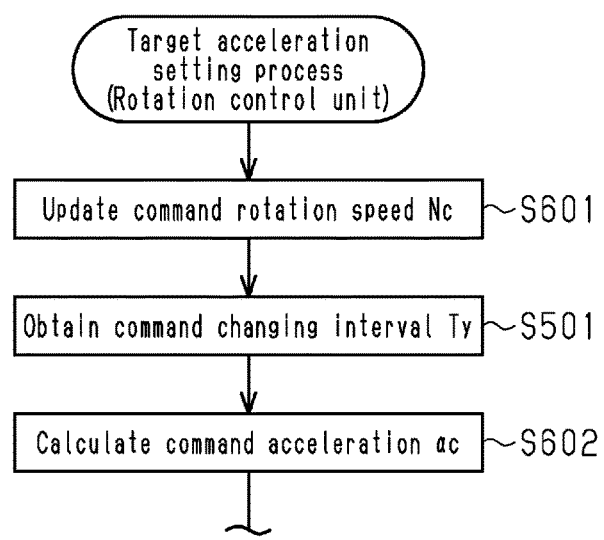
FIG. 13 is a flowchart illustrating the target acceleration setting process of the fourth embodiment.

As shown in FIG. 13, the rotation control unit 35 executes an updating process of the command rotation speed Nc in step S601 and proceeds to step S501.

In the present embodiment, the rotation control unit 35 causes the pre-change command storage area 35d to store, as the pre-change command rotation speed Ncc, the command rotation speed Nc that is currently stored in the new command storage area 35b. The rotation control unit 35 causes the new command storage area 35b to store the presently-obtained new command rotation speed Nc as a new command rotation speed Nca.

In the same manner as the third embodiment, the target acceleration setting process of the present embodiment is executed when the command rotation speed Nc is changed. Thus, the command rotation speed Nc stored in the pre-change command storage area 35d by the process of step S601 is the command rotation speed Nc prior to being changed, not the command rotation speed Nc that was precedingly obtained. That is, the command rotation speed Nc that triggered the execution of the present target acceleration setting process is set as the new command rotation speed Nca, and the command rotation speed Nc that has been set so far is set as the pre-change command rotation speed Ncc.

After executing the process of step S501, the rotation control unit 35 uses the information stored in the command storage areas 35b, 35d and the obtaining result of the step S501 to calculate the command acceleration αc in step S602. The command acceleration αc of the present embodiment is obtained by dividing, by the command changing interval Ty, the difference obtained by subtracting the pre-change command rotation speed Ncc from the new command rotation speed Nca; (αc=(Nca−Ncc)/Tx).

The processes subsequent to S602 are the same as those of the third embodiment and thus will not be described.

The operation of the present embodiment will now be described with reference to FIG. 14.

Figure 14:
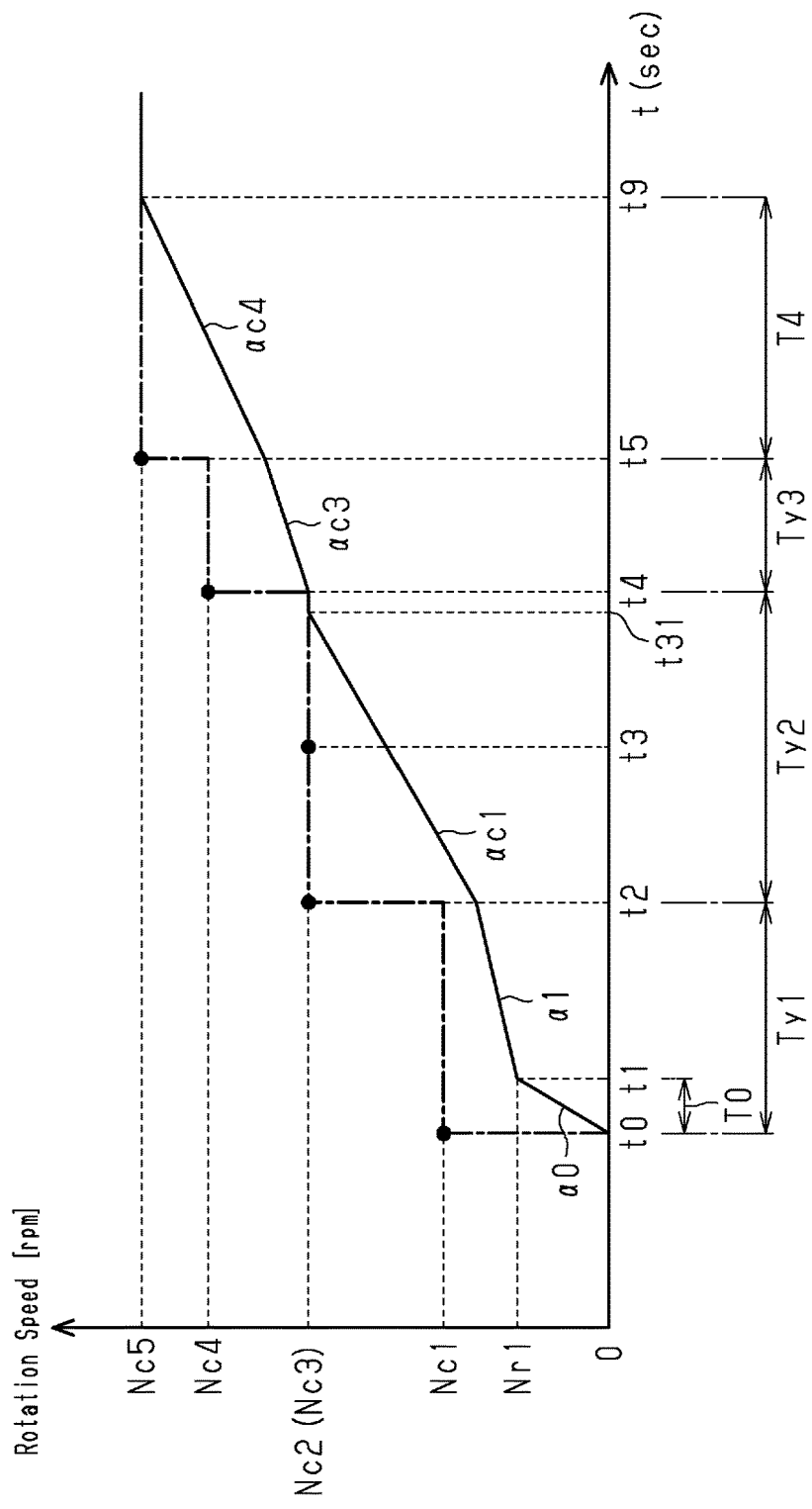
FIG. 14 is a graph illustrating temporal changes in the command rotation speed and temporal changes in the actual rotation speed in the fourth embodiment.

As shown in FIG. 14, the actual rotation speed Nr changes from the point in time t0 to the point in time t2 in the same manner as the first embodiment.

When the second command rotation speed Nc2, which is different from the first command rotation speed Nc1, is obtained at the point in time t2, the first command acceleration αc1 is calculated and the electric motor 11 accelerates at the first command acceleration αc1. The first command acceleration αc1 is obtained by dividing, by the first command changing interval Ty1, the difference obtained by subtracting the first command rotation speed Nc1 from the second command rotation speed Nc2. The first command changing interval Ty1 refers to a period from the point in time t0 to the point in time t2.

Then, it is assumed that the third command rotation speed Nc3 that is equal to the second command rotation speed Nc2 is obtained at the point in time t3. In this case, since the command rotation speed Nc remains unchanged, a new target acceleration at is not set. This causes the acceleration to continue at the first command acceleration αc1, which is the currently-set command acceleration αc.

At the subsequent point in time t31, the actual rotation speed Nr reaches the second command rotation speed Nc2 (third command rotation speed Nc3) so that the constant-speed rotation is performed.

Then, when the fourth command rotation speed Nc4, which is different from the second command rotation speed Nc2, is obtained at the point in time t4, the third command acceleration αc3 is calculated and the electric motor 11 accelerates at the third command acceleration αc3.

The period from the point in time t2 to the point in time t4 is referred to as the second command changing interval Ty2. The third command rotation speed Nc3 is a value obtained by dividing, by the second command changing interval Ty2, the difference obtained by subtracting the second command rotation speed Nc2 from the fourth command rotation speed Nc4. The second command changing interval Ty2 refers to a period from the point in time t2 to the point in time t4.

At the subsequent point in time t5, when the fifth command rotation speed Nc5, which is different from the fourth command rotation speed Nc4, is obtained, the fourth command acceleration αc4 is calculated and the electric motor 11 accelerates at the fourth command acceleration αc4.

The period from the point in time t4 to the point in time t5 is referred to as the third command changing interval Ty3. The fourth command acceleration αc4 is a value obtained by dividing, by the third command changing interval Ty3, the difference obtained by subtracting the fourth command rotation speed Nc4 from the fifth command rotation speed Nc5.

Then, at the point in time t9, when a fourth acceleration period T4 has elapsed from the point in time t5, the actual rotation speed Nr reaches the fifth command rotation speed Nc5 so that the electric motor 11 is rotated at a constant speed.

The present embodiment, as described above in detail, has the following advantages instead of advantages (3-3).

(4-1) The rotation control unit 35 calculates, as the command acceleration αc, a value obtained by dividing the difference between the new command rotation speed Nca and the pre-change command rotation speed Ncc by the command changing interval Ty.

In the same manner as advantage (2-1), such a configuration allows the change rate of the actual rotation speed Nr to become almost equal to the change rate of the command rotation speed Nc per unit of time in each command changing interval Ty.

(4-2) The rotation control unit 35 of the present embodiment sets the target acceleration αt when the command rotation speed Nc has been changed. That is, the target acceleration αt is set only when the new command rotation speed Nca is different from the pre-change command rotation speed Ncc. Thus, the difference never becomes 0 between the new command rotation speed Nca and the pre-change command rotation speed Ncc. This eliminates the need to take into consideration a case where the command rotation speed Nc is 0 like in the second embodiment. Accordingly, the processing (configuration) is simplified.

(4-3) The pre-change command rotation speed Ncc is employed instead of the actual rotation speed Nr as a parameter used to calculate the command acceleration αc. This prevents an inconvenience that occurs because the actual rotation speed Nr is not equal to the command rotation speed Nc, such as sudden acceleration or sudden deceleration that is not intended by the air conditioning ECU 103.

(4-4) In the present embodiment, the command acceleration αc tends to be a lower value as compared with when the command acceleration αc is calculated using the actual rotation speed Nr. Thus, the period of acceleration/deceleration tends to be long. Thus, situations are limited in which the speed becomes the constant speed at a stage of acceleration or deceleration that sequentially changes the command rotation speed Nc. This prevents the worsening of the NV characteristics that results from alternate switching between the constant-speed state and the acceleration/deceleration state.

Each of the above-described embodiments may be modified as follows. The above-described embodiments and the following modifications may be combined as long as the combined modifications remain technically consistent with each other.

The obtaining unit 34 simply needs to receive the command rotation speed Nc transmitted from the air conditioning ECU 103 and may have any specific configuration. For example, when the air conditioning ECU 103 transmits a command using a wireless signal, the obtaining unit 34 may be a module that receives the wireless signal.

The command acceleration αc may be calculated in any specific mode. For example, in the first embodiment, the rotation control unit 35 may calculate a first specific acceleration as the target acceleration αt when a calculated value obtained by dividing the difference obtained by subtracting the actual rotation speed Nr from the new command rotation speed Nca by the command obtaining interval Tx is within a first range, or may calculate a second specific acceleration as the target acceleration αt when the calculated value is within a second range. The other embodiments may be changed in the same manner.

The actual rotation speed Nr does not have to be obtained by the estimating unit 33. Instead, for example, the actual rotation speed Nr may be obtained by a dedicated sensor (for example, resolver). That is, the actual rotation speed Nr may be estimated through calculation or the like or may be detected by a sensor. Additionally, aside from the estimating unit 33 and the obtaining unit 34 (first obtaining unit), a second obtaining unit may be provided to obtain the actual rotation speed Nr.

In the second embodiment, the rotation control unit 35 may execute a process that sets a prespecified acceleration as the target acceleration αt instead of the acceleration continuing process in step S304. That is, the target acceleration αt set when the command acceleration αc is 0 is not limited to the currently-set value.

In each embodiment, at least the processes of steps S205, S206 or the processes of steps S207, S208 may be omitted.

In each embodiment, the sequence of the processes related to the rotation control process may be changed.

When the command rotation speed Nc is obtained during the activation period T0, the rotation control unit 35 may set the target acceleration αt based on the obtained command rotation speed Nc and accelerates the electric motor 11 at the set target acceleration αt.

The rotation control unit 35 may continue the acceleration at the activation acceleration α0 until satisfaction of the condition that the next command rotation speed Nc has been obtained or the condition that the activation acceleration α0 has become the command rotation speed Nc. That is, the acceleration at the initial acceleration α1 is not required.

The air conditioning ECU 103 does not have to transmit, to the inverter controller 14, the same command rotation speed Nc as the preceding one.

The on-vehicle motor-driven compressor 10 does not have to be used in the on-vehicle air conditioner 101 and may be used in other devices. For example, if the vehicle 100 is a fuel cell vehicle, the on-vehicle motor-driven compressor 10 may be used in an air supplying device that supplies air to the fuel cell. That is, the fluid subject to compression is not limited to refrigerant and may be, for example, air.

The on-vehicle fluid machine is not limited to the on-vehicle motor-driven compressor 10 provided with the compression portion 12 for compressing fluid. For example, in the case in which the vehicle 100 is a fuel cell vehicle, the on-vehicle fluid machine may be an electric pump device having a pump that supplies hydrogen to the fuel cell without compressing it and an electric motor that drives the pump. In this case, the inverter controller 14 may be used to control the electric motor that drives the pump.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An inverter controller used to control an inverter circuit, the inverter circuit being configured to drive an electric motor arranged in an on-vehicle fluid machine, the inverter controller comprising a processing circuitry configured to:
   obtain a command rotation speed transmitted repeatedly from outside of the inverter controller;
   count a command obtaining interval that is a period from a point in time where an old command rotation speed was obtained to a point in time where a new command rotation speed is obtained, the old command rotation speed being the command rotation speed that was precedingly obtained, the new command rotation speed being the command rotation speed that is presently obtained;
   set a target acceleration of the electric motor when the command rotation speed has been obtained; and
   control the inverter circuit such that the electric motor rotates at the set target acceleration,
   wherein the processing circuitry is configured to calculate a command acceleration based on the counted command obtaining interval and the new command rotation speed, the command acceleration being set as the target acceleration.

2. The inverter controller according to claim 1, wherein the processing circuitry is configured to obtain an actual rotation speed, the actual rotation speed being a rotation speed of the electric motor, and the command acceleration is a value obtained by dividing, by the command obtaining interval, a difference between the new command rotation speed and the actual rotation speed.

3. The inverter controller according to claim 1, wherein the command acceleration is a value obtained by dividing, by the command obtaining interval, a difference between the new command rotation speed and the old command rotation speed.

4. The inverter controller according to claim 3, wherein the processing circuitry is configured to maintain a currently-set value as the target acceleration when the command acceleration is 0.

5. The inverter controller according to claim 1, wherein the processing circuitry is configured to set a predetermined upper limit acceleration as the target acceleration when the command acceleration is greater than or equal to the upper limit acceleration.

6. The inverter controller according to claim 1, wherein the processing circuitry is configured to set a predetermined lower limit acceleration as the target acceleration when the command acceleration is greater than or equal to the lower limit acceleration.

7. The inverter controller according to claim 1, wherein the processing circuitry is configured to accelerate the electric motor at a predetermined activation acceleration, regardless of whether the command rotation speed has been obtained, until a predetermined activation period has elapsed since the electric motor was activated.

8. An on-vehicle fluid machine, comprising:
   an electric motor;
   an inverter circuit that drives the electric motor; and
   the inverter controller according to claim 1.

9. The on-vehicle fluid machine according to claim 8, wherein the on-vehicle fluid machine is an on-vehicle motor-driven compressor including a compression portion driven by the electric motor.

10. An inverter controller used to control an inverter circuit, the inverter circuit being configured to drive an electric motor arranged in an on-vehicle fluid machine, the inverter controller comprising a processing circuitry configured to:
    obtain a command rotation speed transmitted repeatedly from outside of the inverter controller;
    set a target acceleration of the electric motor when the obtained command rotation speed has been changed; and
    control the inverter circuit such that the electric motor rotates at the set target acceleration,
    wherein the processing circuitry is configured to:
       count a command changing interval that is a period from a point in time where the command rotation speed was precedingly changed to a point in time where the command rotation speed is presently changed; and
       calculate a command acceleration based on the counted command changing interval and a new command rotation speed, the command acceleration being set as the target acceleration, the new command rotation speed being the command rotation speed that is presently changed.

11. The inverter controller according to claim 10, wherein the processing circuitry is configured to obtain an actual rotation speed, the actual rotation speed being a rotation speed of the electric motor, and the command acceleration is a value obtained by dividing, by the command changing interval, a difference between the new command rotation speed and the actual rotation speed.

12. The inverter controller according to claim 10, wherein the command acceleration is a value obtained by dividing, by the command changing interval, a difference between the new command rotation speed and a pre-change command rotation speed, the pre-change command rotation speed being the command rotation speed prior to being changed.

13. The inverter controller according to claim 10, wherein the processing circuitry is configured to set a predetermined upper limit acceleration as the target acceleration when the command acceleration is greater than or equal to the upper limit acceleration.

14. The inverter controller according to claim 10, wherein the processing circuitry is configured to set a predetermined lower limit acceleration as the target acceleration when the command acceleration is greater than or equal to the lower limit acceleration.

15. The inverter controller according to claim 10, wherein the processing circuitry is configured to accelerate the electric motor at a predetermined activation acceleration, regardless of whether the command rotation speed has been obtained, until a predetermined activation period has elapsed since the electric motor was activated.

16. An on-vehicle fluid machine, comprising:
an electric motor;
an inverter circuit that drives the electric motor; and
the inverter controller according to claim 10.

17. The on-vehicle fluid machine according to claim 16, wherein the on-vehicle fluid machine is an on-vehicle motor-driven compressor including a compression portion driven by the electric motor.

* * * * *